(12) United States Patent (10) Patent No.: US 7,704,423 B2
Takatori et al. (45) Date of Patent: Apr. 27, 2010

(54) METHOD FOR EXPANSION INJECTION MOLDING

(75) Inventors: Hiroyuki Takatori, Ube (JP); Akio Okamoto, Onoda (JP); Naoto Yamamoto, Ube (JP); Fumihiko Shimizu, Ube (JP)

(73) Assignee: Ube Machinery Corporation, Ltd., Ube-shi (JP)

( * ) Notice: Subject to any disclaimer, the term of this patent is extended or adjusted under 35 U.S.C. 154(b) by 563 days.

(21) Appl. No.: 10/504,332

(22) PCT Filed: Feb. 28, 2003

(86) PCT No.: PCT/JP03/02377

§ 371 (c)(1),
(2), (4) Date: Aug. 25, 2004

(87) PCT Pub. No.: WO03/072335

PCT Pub. Date: Sep. 4, 2003

(65) Prior Publication Data

US 2005/0230861 A1 Oct. 20, 2005

(30) Foreign Application Priority Data

| Feb. 28, 2002 | (JP) | ............................. | 2002-052591 |
| Mar. 13, 2002 | (JP) | ............................. | 2002-067893 |
| Apr. 18, 2002 | (JP) | ............................. | 2002-115676 |
| Apr. 18, 2002 | (JP) | ............................. | 2002-115677 |

(51) Int. Cl.
B29C 45/00 (2006.01)
B29C 44/38 (2006.01)

(52) U.S. Cl. ..................................... 264/51; 264/328.1

(58) Field of Classification Search ............... 264/45.5, 264/46.4, 51, 328.7
See application file for complete search history.

(56) References Cited

U.S. PATENT DOCUMENTS 3,940,467 A * 2/1976 Brachman .................. 264/45.5

(Continued)

FOREIGN PATENT DOCUMENTS

CA 1105219 A1 7/1981

(Continued)

OTHER PUBLICATIONS

Office Action mailed Jun. 17, 2008, issued on the corresponding Japanese Patent Application No. 2003-571066 and its partial translation.
Office Action dated Sep. 29, 2009, issued on the Canadian patent application. 2,477,149.

*Primary Examiner*—Monica A Huson
(74) *Attorney, Agent, or Firm*—Edwards Angell Palmer & Dodge LLP

(57) ABSTRACT

An injection-foaming molding process for manufacturing a formed article by injecting a molten resin containing a foaming agent into a cavity of a mold being retained in an openable state and then expanding the cavity by opening the mold to allow the resin to foam includes:
i) a step of discontinuing a cavity of a mold from a resin-reserving section located at front end of a screw immediately after the completion of injection of a molten resin containing an expandable resin into the mold cavity; and
ii) a step of keeping the resin-reserving section under pressure at least equal to back pressure for charging during a period from the completion of injection to start of charging the molten resin containing the expandable resin for next shot, decreasing pressure in the resin-reserving section to back pressure for charging, and then starting the charging. According to the process, a molding cycle can be shortened and a lightweight formed article by foaming having high rigidity and good appearance can be obtained.

13 Claims, 6 Drawing Sheets

U.S. PATENT DOCUMENTS

| | | | | |
|---|---|---|---|---|
| 4,067,673 | A | * | 1/1978 | Hendry ................. 425/4 R |
| 4,806,293 | A | * | 2/1989 | Akiyama et al. ............ 264/53 |
| 5,281,376 | A | * | 1/1994 | Hara et al. ............... 264/46.4 |
| 5,997,781 | A | | 12/1999 | Nishikawa et al. |
| 6,129,870 | A | | 10/2000 | Hettinga |
| 6,322,347 | B1 | * | 11/2001 | Xu ....................... 425/376.1 |
| 6,773,640 | B2 | * | 8/2004 | Sugihara et al. ............ 264/50 |

FOREIGN PATENT DOCUMENTS

| | | |
|---|---|---|
| EP | 887168 A1 | 12/1998 |
| GB | 1292318 A | 10/1972 |
| JP | 48-000650 | 1/1973 |
| JP | 48-022164 | 3/1973 |
| JP | 48-056270 | 8/1973 |
| JP | 62-246710 | 10/1987 |
| JP | 04-214311 | 8/1992 |
| JP | 5-429 | 1/1993 |
| JP | 6-320591 | 11/1994 |
| JP | 07-009487 | 1/1995 |
| JP | 8-192439 | 7/1996 |
| JP | 08-300392 | 11/1996 |
| JP | 9-327848 | 12/1997 |
| JP | 10-156884 | 6/1998 |
| JP | 10-230528 | 9/1998 |
| JP | 10-291241 | 11/1998 |
| JP | 11-147235 | 6/1999 |
| JP | 2000-263614 | 9/2000 |
| JP | 2001-001379 | 1/2001 |
| JP | 2001-162660 | 6/2001 |
| JP | 2002-321262 | 11/2002 |

* cited by examiner

METHOD FOR EXPANSION INJECTION MOLDING

TECHNICAL FIELD

The present invention relates to injection molding processes for expandable plastic compositions. More particularly, it relates to an injection-foaming molding process for manufacturing a lightweight plastic formed article by foaming having a fine and uniform highly foamed structure, high thermal insulation, and high rigidity. A first aspect of the present invention relates to an injection-foaming molding process for manufacturing a formed plastic article by foaming having a surface of densely foamed structure. A second aspect of the present invention relates to an injection-foaming molding process for manufacturing a plastic formed article having a skin material having a surface layer of a high quality, and particularly relates to an injection compression type forming process under the conditions that a resin is injected into a mold which is opened with employment of a relatively thick surface material. A third aspect of the present invention relates to an injection-foaming molding process for manufacturing a plastic formed article by foaming which includes a skin material having a surface layer of a high quality, and particularly relates to a an injection compression type molding process for injecting resin into a mold in such a manner that the mold is opened with employment of a relatively thin skin material.

BACKGROUND ART

Examples of a technique relating to an injection molding process for foamed plastic include JP-A-62-246710, JP-A-4-214311, JP-A-7-9487, JP-A-8-300392, JP-A-10-156884, and JP-A-11-147235.

For example, JP-A-62-246710 discloses a known technique relating to an injection-foaming molding process for manufacturing a plastic formed article by foaming having an internal portion of a densely foamed structure. In this document, there is disclosed an injection-foaming molding process wherein an injection machine includes a mold for forming an article being connected to an injection port and being composed of a fixed mold and a movable mold movable toward or away from the fixed mold is used; and wherein a cavity being formed therebetween and being expanded or contracted by the movement of the movable mold is expanded to a predetermined space by retracting the movable mold before a foaming agent is injected into the mold.

JP-A-4-214311 discloses an injection-foaming molding process for manufacturing a plastic formed article by foaming having a densely foamed structure. In this process, a pair of mold members that can be fitted to each other and moved in the direction that the volume of a cavity is increased or decreased are each placed at corresponding positions for allowing the cavity to have a reduced volume; the mold is moved in the direction that the cavity volume is increased while a molten expandable resin is being injected into the cavity in such a manner that the pressure of the resin is maintained such that the resin does not foam; the mold is moved in the direction that the cavity volume is decreased, whereby the resin is compressed; a surface portion of the resin is cooled to solidify the surface portion; the pressure of the resin is reduced by moving the mold in the direction that the cavity volume is increased, whereby an inner portion of the resin is allowed to foam; and the resulting resin is cooled into an article, which is then demolded from the mold. An object of this process is to adjust the foaming magnification by controlling the clamping position of an injection-foaming forming machine.

JP-A-8-300392 discloses an injection-foaming molding process for manufacturing a plastic formed article by foaming having a foamed structure. In this process, it is stated that problems, such as a change in volume and a change in fluidity which are caused by foaming can be eliminated and the fluidity is therefore maintained satisfactorily with heating under control conditions a resin containing a foaming agent is heated in a cylinder at a temperature that is higher than or equal to the melting point of the resin but lower than or equal to the thermal decomposition temperature of the foaming agent. The injected resin is heated in, for example, a nozzle placed between the cylinder and a mold, whereby the foaming agent is heated to a temperature higher than or equal to the thermal decomposition temperature thereof. Therefore, the foaming agent is partly decomposed by heat depending on the kind of the foaming agent and starts to foam in a trace amount; however, almost of all the molten resin remains in a substantially unfoamed state. The resin is then injected into a cavity through a gate placed in the mold. Since the resulting resin is in contact with the mold or a thin skin material placed in the mold, the resin is quenched to a temperature less than or equal to the melting point thereof, whereby a surface portion of the resin that has not been foamed yet or has been slightly foamed is formed into a skin layer. In contrast, an inner portion of the resin that is not quenched in the cavity is allowed to foam and formed into a core. The skin layer is pressed against the inner wall of the mold or an inner surface of the skin material by the pressure of cells formed in the core; hence, the skin layer has no sink marks and any deterioration in quality such as distortion or a change in color do not occur on the surface of the skin layer because the foaming pressure is moderate. The formed article obtained is a laminate including the skin material of a high texture and the resin, securely bonded to the skin material, functioning as a substrate. The formed article includes the skin layer having no sink marks but high surface quality and strength and the core having been foamed and being therefore light in weight.

In other words, this document discloses an injection-foaming molding process in which a cavity of a mold is completely filled with an expandable resin in such a manner that the mold cavity is reduced in volume while the resin is being injected into the cavity or just after the injection is finished, the resulting resin is cooled until a surface portion of the resin in contact with a wall of the cavity is solidified to form a surface layer but an inner portion of the resin is maintained in a molten state, and the mold cavity is then expanded to a volume designed for an article to be formed.

However, in the technique dispersed in JP-A-62-246710, since the cavity volume is increased together with the start of the injection, cells present under a surface portion of the formed article are ruptured; hence, the surface (skin layer) does not have a non-cellular structure or a densely foamed structure with a lower expansion rate. Furthermore, since the cavity volume is large, the cavity cannot be completely filled with the resin when there is employed a mold having a narrow portion (a portion having a large flow resistance) at a remote portion from the gate.

On the other hand, in the process disclosed in JP-A-4-214311, in order to increase the pressure of the resin in the cavity to prevent the resin from foaming, the cavity volume is reduced at the start of the injection; hence, the flow resistance is large and the injection time is therefore long. Furthermore, after the surface portion of the formed article is cooled and solidified by expanding or contracting the cavity during the injection and the skin layer is thereby formed, the cavity is expanded again to allow the resin to foam. In this process, the control of foaming becomes difficult since the viscosity of the molten resin is increased due to a decrease in resin temperature, in addition to a prolonged cycle time for forming and the resulting lowered production efficiency.

In the process disclosed in JP-A-8-300392, after the cavity volume is reduced during the injection and this state is maintained for a predetermined period of time, the cavity is expanded, whereby the resin is allowed to foam. Therefore, no consideration has been taken as to the injection time, and the prevention of foaming at a reserving section located upstream of a screw together with the prolonged time of the forming cycle. Therefore, there is a problem in that cell nuclei formed in the resin-reserving section are not only mixed with an article to be formed in the next cycle but also foaming cannot be substantially controlled due to a increase in viscosity caused by a decrease in resin temperature when the injection time is prolonged.

On the other hand, examples of well-known processes for manufacturing a formed article by foaming include an injection-foaming molding process which is called as a short shot process in which a resin containing a foaming agent is injected into a mold in a short shot and then allowed to foam in the mold, or a full shot process in which a resin containing a foaming agent is injected into a mold in a full shot and then allowed to foam while the mold is being opened, whereby an article is formed.

The injection-foaming molding process wherein the resin is allowed to foam by increasing the cavity volume, which is represented by the full shot process, cannot be performed with a known, ordinary injection molding machine.

Therefore, in order to perform the injection-foaming molding process in which the resin is allowed to foam by increasing the cavity volume, an injection-foaming molding machine including a special clamping device must be used. As is known, injection-foaming molding machines having such a special function are disclosed in JP-A-48-650, JP-A-48-22164, and JP-A-48-56270.

The injection-foaming molding machines disclosed in those documents each include a clamping device, which is of a straight-hydraulic type. The clamping device is used to freely open a mold, placed between a fixed platen and a movable platen connected to a hydraulic cylinder, by moving the movable platen toward or away from the fixed platen. In each injection-foaming molding machine, the mold is opened or closed with the clamping device, whereby the cavity volume is increased and the resin is therefore allowed to foam.

However, in case of the injection-foaming molding process according to the above-mentioned conventional short shot process, there likely occurs such a phenomenon that the foaming agent contained in a molten resin is burst during injection of a molten resin containing a foaming agent into the cavity (this phenomenon is often called as a broken foam). In the case of a formed article containing broken foams, there is a problem that it has a surface roughness referred to as a swirl mark.

In contrast, in case of the injection-forming molding process according to the full shot process, a formed article by foaming thereby has substantially no surface roughness, that is, the formed article has a smooth surface. However, the full shot process, in which the resin is allowed to foam by increasing the cavity volume, has problems in that serious changes in foaming magnification, cell diameter, and/or skin layer thickness are caused in the foamed article, due to a quite minor deviation in the manner of opening the mold, for example, a deviation in timing for starting to open the mold, a deviation in opening speed, or a deviation in opening stroke. The hydraulic cylinder included in the clamping device, which is of the straight hydraulic type, has a problem in that operational reproducibility is low because the cylinder has operating characteristics sensitive to the temperature of oil used; hence, conforming products cannot be substantially manufactured continuously with high reproducibility.

Even if the position of the hydraulic cylinder is feedback-controlled to improve the operational reproducibility of the clamping device, the control accuracy does not substantially exceed the operational accuracy of the clamping device. Therefore, there are demands of developing a molding machine with which the full shot process can be performed with high accuracy and a method for controlling the machine, for performing the process, with high accuracy.

In the full shot process as well as ordinary injection molding processes, since a pressure is applied to the resin immediately after the completion of the injection in many cases, a portion of the resin must be allowed to remain at the front end of a screw placed in an injection cylinder. However, the resin portion remaining at the front end of the screw causes problems such as a decrease in foaming magnification, surface roughness, and defects in an article to be formed in the next shot because degassing or the formation of broken foams occurs in the resin portion due to the drop in the pressure in a charging operation for the next step.

Furthermore, the resin, which has been injected into the mold with a high pressure by the full shot process, has large pressure variations (differences in pressure) therein because there is a pressure gradient ranging from a gate section to a final injection point. The injected resin having such pressure variations has a difference in density between a portion close to the gate section and a portion away from the gate section. Therefore, there is a problem in that the formed article has a variation in the thickness of the skin layer and/or a difference in foaming magnification when the resin having such portions with different densities is allowed to foam as intact.

DISCLOSURE OF INVENTION

The present invention has been made to solve the problems of the known techniques described above. It is an object of the present invention to provide an injection-foaming molding process for efficiently manufacturing a lightweight plastic formed article by foaming in a short molding cycle. The formed article includes a highly foamed layer and has a good appearance and toughness and may optionally include a skin material.

The intensive studies were made to solve the above-mentioned problems and the present inventors found that the problems described above can be solved by the use of a process described below, and the present invention has been completed based on these findings. Such an injection-foaming molding process for manufacturing a formed article by foaming by injecting a molten resin containing a foaming agent into a cavity of a mold being retained in an openable state and then expanding the cavity by opening the mold to allow the resin to foam includes:

i) a step of discontinuing a cavity of a mold from a resin-reserving section located at front end of a screw immediately after the completion of the injection of a molten resin containing an expandable resin into the mold cavity; and ii) a step of keeping the resin-reserving section under the pressure at least equal to the back pressure for the charging during the period from the completion of injection to the start of charging the molten resin containing the expandable resin for the next shot, decreasing pressure in the resin-reserving section to the back pressure for the charging, and then starting the charging.

According to those steps, since the movement of a movable mold can be limited to one direction, the molding cycle can be shortened. Furthermore, the invention can achieve such an excellent effect that the great improvement in the occurrence of the defected formed articles can be attained. This is because coarse cells formed in the remaining resin portion are not injected into the cavity together with another portion of the molten resin in the next injection operation; said coarse cells being formed due to the foaming of a portion of the molten resin containing a foaming agent which remained in the vicinity of the resin-reserving section located at the front end of the screw equipped in an injection-foaming molding machine with the release of the pressure.

In this process, the injection of a necessary amount of the molten resin containing the foaming agent into the mold cavity is preferably completed in three seconds. Furthermore, in a step of injecting the molten resin into the mold cavity, a mold-opening control device is preferably controlled in such a manner that the mold is clamped with a clamping force insufficient to cause wear on the surface of an article formed. In a foaming step subsequent to the completion of the resin injection, the mold-opening control device is preferably controlled in such a manner that the mold is opened until a desired opening stroke is achieved.

The mold-opening control device is preferably driven by an electric servomotor.

The present invention includes an injection-foaming molding process including a step of injecting a necessary amount of a molten resin containing a foaming agent into the mold cavity having a volume equal to that determined by subtracting the resin volume reduced due to cooling and solidification from the volume of the injected resin and a step of, after the injection of the resin containing the foaming agent is completed, forming a skin layer by cooling and solidifying a surface portion of the molten resin in contact with the mold and expanding the cavity by opening the mold to allow the resin to foam. This process is referred to as a first aspect.

Before the molten resin containing the foaming agent is injected into a cavity of a mold including a pair of molds facing each other, a skin material may be provided between the molds and the mold may be then clamped. After that, the molten resin containing the foaming agent may be injected into the cavity defined by the skin material and the mold. The volume of the cavity filled with the molten resin varies between second and third aspects described below.

In the second aspect, the volume of the cavity into which a molten resin containing a foaming agent is injected and which is defined by the skin material and the molds is equal to a volume determined by adding the resin volume reduced due to cooling and solidification (a difference between the volume of the resin maintained at a molding temperature and that of the resin cooled to room temperature) to the volume of the cavity of the mold which has been fully closed and in which the injected resin has not been allowed to foam. In this aspect, a first closing position preferably corresponds to a position for achieving an opening stroke of 5 to 50 mm. Furthermore, the mold is preferably clamped by moving one of the molds from the first closing position to a final clamping position at a clamping speed of 20 to 70 mm/sec after the injection is completed.

In the third aspect, the cavity into which a molten resin containing a foaming agent is injected and which is defined by the skin material and the molds is preferably adjusted to have a volume equal to that determined by subtracting the resin volume reduced due to cooling and solidification from the volume of the injected resin. In this aspect, the skin material preferably has at least one decorative face. Furthermore, it is preferable that the skin material has a size sufficient to cover a part of an article to be formed.

The present invention can be roughly categorized into the three aspects as described above. The first aspect relates to an injection-foaming molding process in which before a molten resin containing a foaming agent is injected into a cavity of a mold and the cavity is expanded by opening the mold so as to allow the resin to foam, a skin layer is formed by cooling and solidifying a surface portion of the molten resin in contact with the mold, whereby a formed article by foaming including the skin layer and a foaming layer formed by foaming due to the foaming agent, the skin layer and the foaming layer being integrated into one member. This process is usually referred to as "an ordinary injection-foaming molding process".

The second aspect relates to an injection-foaming molding process to obtain a laminate article formed by foaming wherein a resin and a skin material are integrally formed as a one member; which includes a step of, at the time when a molten resin containing a foaming agent is injected into a cavity of a mold including a pair of molds facing each other, providing a skin material between the mold, closing the mold by moving one of the mold members to a predetermined position and then temporarily holding the moved member in that position, and a step of injecting the molten resin into the cavity defined by the skin material and the mold. This process is usually referred to as "an injection press-type foam-molding process". This aspect relates to a so-called injection press-type molding process that is suitable to form a formed article by foaming including a skin material, particularly a thick skin material.

The third aspect relates to an injection-foaming molding process to obtain a laminate article composed of integrated resin and skin material as a one member; said process comprising a step of closing a mold after the provision of a skin material between a pair of mold members, and allowing a molten resin containing a foaming agent to foam by opening a movable mold to expand the cavity after the injection thereof into a cavity defined by the skin material and the mold; wherein said process includes a step of, at the time when the molten resin is injected into the cavity, adjusting the volume of the cavity to a volume determined by subtracting a resin volume reduced due to cooling and solidification thereof from a volume of the injected resin, and then injecting a molten resin containing a foaming agent into the cavity. The process is usually referred to as an injection press foaming-type molding process. In this aspect, the skin material is also used, however, this aspect is directed to a molding process suitable to form a formed article by foaming wherein a skin material having a relatively small thickness is employed. In this aspect, an article to be formed is not necessarily covered entirely with a skin material.

Figure 1:
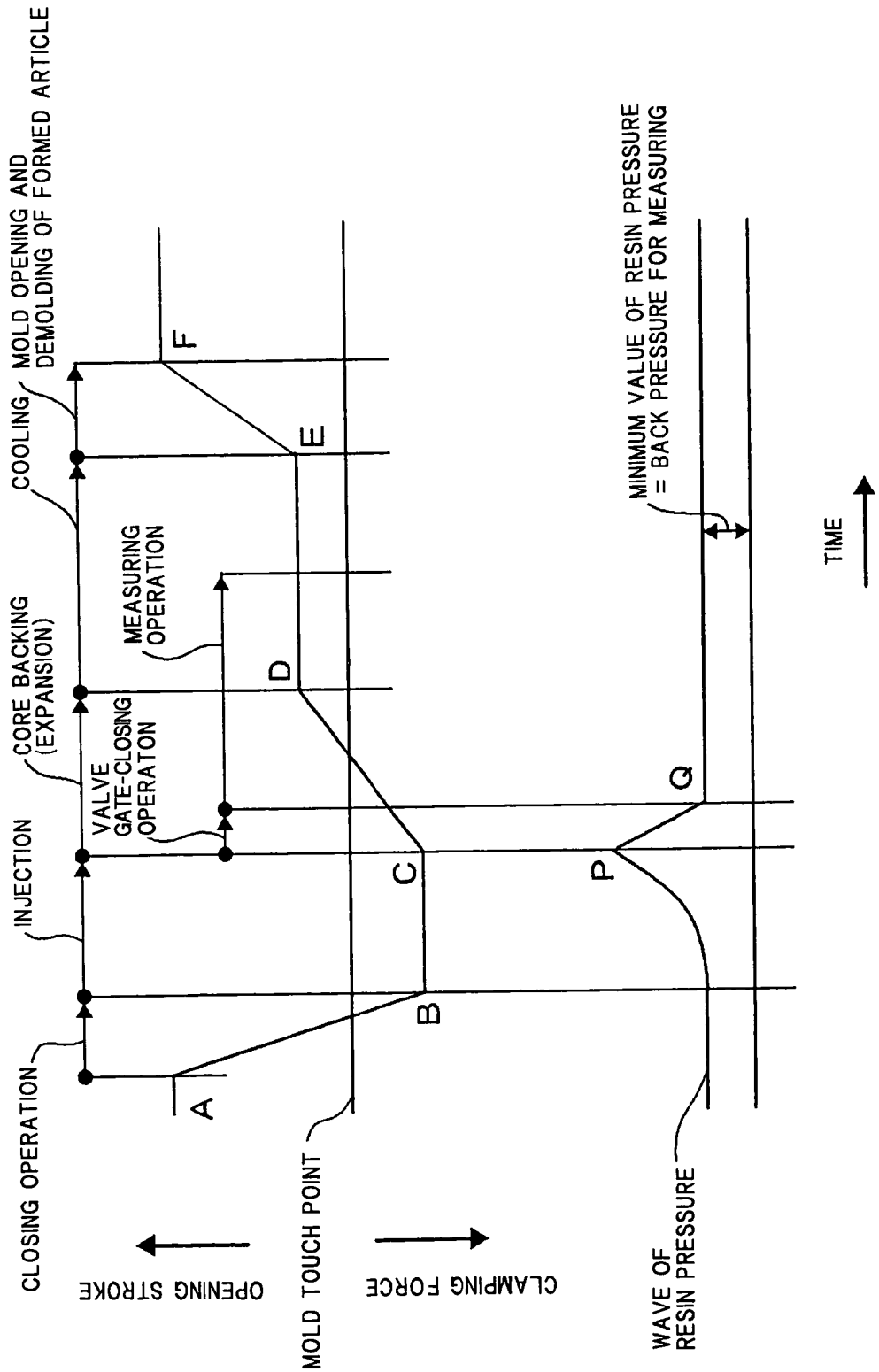
FIG. 1 is a chart showing the relationship between an injection operation, a mold-opening operation, and the pressure of resin in a molding cycle of a first embodiment according to the present invention.

Symbols and reference numerals used in the accompanying drawings have the following meanings:

A: position for fully opening a mold
B: clamping position
C: point of time when injection is completed
D: position of a mold at a point of time when a foaming step is completed (point of time when a cooling step is started)
E: point of time when the cooling step is completed
F: position for fully opening the mold (as well as Point A)
P: back pressure (peak pressure in an injection step)
Q: point of time when a shut-off valve (valve gate) is fully closed
B': point of time when an injection step is started (first closing position)
D': final clamping position (position of a mold in a shaping step)
E': point of time when the shaping step is completed
F': position of the mold at a point of time when a foaming step is completed (point of time when a first cooling step is started)
G': point of time when the first cooling step is completed (point of time when a step of slightly opening a mold is started)
H': point of time when the slightly opening step is completed (point of time when a second cooling step is started)
I': point of time when the second cooling step is completed and the reheating of a skin material is started
J': position for fully opening the mold (as well as Point A)
D": position of a mold at a point of time when a foaming step is completed (point of time when a first cooling step is started)
E": point of time when the first cooling step (shaping step) is completed (point of time when a step of slightly opening a mold)
F''': point of time when the slightly opening step is completed (point of time when a second cooling step is started)
G": point of time when the second cooling step is completed and the reheating of a skin material is started
H": position for fully opening the mold (as well as Point A)
1: fixed platen
2: movable platen
3: fixed mold
4: movable mold
7: tie bars
8: toggle clamping unit
8a: toggle arm
8b: toggle arm
8d: crosshead
10: molding device
20: clamping device
30: injection device
25: driving link
44: shut-off nozzle (valve gate)
60: control device
71: movable platen-positioning sensor
74: stroke sensor
80: temperature sensor
75: clamping force-detecting section
100: injection-foaming molding machine

BEST MODE FOR CARRYING OUT THE INVENTION

The present invention is a molding process characterized in that, in any embodiments thereof, an injection-foaming molding machine (hereinafter simply referred to as an injection molding machine or a molding machine) for injection foaming molding is employed; the molding machine including a discontinuing unit such as a shut-off nozzle or a valve gate, and a dwelling unit being equipped with an injection cylinder, an electric servomotor and the like, and that the dwelling unit is operated to keep pressure in the resin-reserving section being located at the front end of a screw maintained at a value equal to or greater than the back pressure applied to the resin during charging, at the same time when the portion between the cavity of the mold and resin-reserving section being located at the front end of a screw is discontinued.

The discontinuation of the portion between the cavity of the mold and resin-reserving section being located at the front end of a screw is carried out by a valve operation in such a manner that a shut-off nozzle placed at the front end of a barrel or a valve gate incorporated in the mold is kept at a stopping state. Since the pressure of the resin in the resin-reserving section can be freely controlled by discontinuing the portion between the cavity of the mold and resin-reserving section being located at the front end of a screw, as mentioned above, one may prevent the resin from scattering during charging and/or flowing into the mold.

After the completion of the injection, the pressure of the resin in the resin-reserving section is immediately controlled. A method for the control is categorized into two methods described below, and the pressure of the resin in the resin-reserving section is maintained at a value equal to the back pressure applied to the resin during charging by any one of the methods mentioned below. The screw is driven to start the charging in that state. After a charging reaches a predetermined value, the operation of the screw is stopped.

The controlling of pressure (including the back pressure for the charging) of the resin can be done in the two patterns described below.

(1) To start a charging step immediately by reducing resin pressure from the packing pressure (the peak pressure in the mold cavity) generated at the completion of injection to the preset back pressure for the charging.

(2) To reduce resin pressure to the preset back pressure for the charging immediately after the start of charging while maintaining the resin pressure at the level equal to the packing pressure (the peak pressure in the mold cavity) generated at the completion of injection.

The reason for using a molding machine having the function described above is to avoid the phenomenon described below. In an ordinary injection molding process, after the injection is completed, the pressure of the resin in the resin-reserving section is reduced to zero before a plasticating/charging step is performed. In this situation, in the resin-reserving section in the barrel and a hot runner section of the mold, a foaming gas confined in the resin by pressure creates bubbles because the pressure is released, whereby coarse cells are formed in a portion of the resin. It is known that the resin portion, placed in the resin-reserving section, containing such coarse cells is injected into the mold cavity in the next cycle to contaminate an article formed, and that the contaminated article causes the defects in the formed article.

The present invention has been completed based on the findings that such molding defects can be avoided, as is described below, by the use of the molding machine having the above function.

The present invention will now be described in detail with reference to the respective embodiments.

A first embodiment relates to an injection-foaming molding process which comprises a step of injecting a molten resin containing a foaming agent into an expandable cavity of a mold, and then allowing the injected resin to foam by opening the mold to expand the cavity, thereby a formed article by foaming having a skin layer and a foamed layer is formed; the skin layer being formed by cooling and solidifying a portion of the resin that is in contact with the mold, the foamed layer being formed in the mold by allowing the foaming agent to foam; and this process includes the following steps (a) to (d) in addition to Steps (i) and (ii) mentioned above:

(a) a step of injecting a necessary amount of a molten resin containing a foaming agent into a cavity of a mold to fill the cavity within a preset time, the cavity having a volume equal to that determined by subtracting the resin volume reduced due to cooling and solidification from the volume of the injected resin;

(b) a step of continuously opening the mold by moving a movable mold to a preset position for achieving a predetermined opening stroke immediately after the injection is completed;

(c) a step of holding the mold in the preset position for a predetermined period of time; and (d) a step of fully opening the mold to demold a formed article from the mold after a predetermined cooling time is elapsed.

In this embodiment, in the step of injecting a necessary amount of the molten resin containing the foaming agent into the mold cavity having a volume equal to that obtained by subtracting the resin volume reduced due to cooling and solidification from the volume of the injected resin, the injection is preferably completed in three seconds.

Steps (a) to (d) will now be individually described in that order.

Step (a)

In the first embodiment of the present invention, an ordinary injection molding technique is fundamentally used in the injection step. That is, the present process is not a process wherein an injection press molding technique in which the mold is opened in the injection step or an injection compression molding technique in which a clamping force that is less than the pressure of the injected resin and is insufficient to keep the mold closed is applied to the mold, but the process wherein an injection molding technique in which a clamping force that is greater than the pressure of the injected resin and is sufficient to keep the mold closed is applied to the mold. This means that "the necessary amount of a molten resin containing a foaming agent is injected into a mold cavity having a volume equal to that determined by subtracting the resin volume reduced due to cooling and solidification from the volume of the injected resin". The packing pressure (the peak pressure at the completion of the injection) can be thereby maintained when the injection is completed.

The clause "injection is completed in a preset time" herein means that high-speed injection is performed. The high-speed injection can be defined using the injection speed (the amount of the resin that can be injected into the mold cavity in a unit time) when the volume of the mold cavity is constant; however, actual molds have different sizes. If the clamping force is limited within a range of 350 to 2000 tons, the injection speed ranges from 300 to 1200 g/sec. Therefore, in the present invention, the high-speed injection is defined as a technique for filling a mold cavity in at least 0.1 seconds and preferably in 0.2 to 3 seconds when a molding machine has a clamping force of 350 tons, a screw diameter of 52 mm, and an injection speed of 160 mm/s or more. It will be understandable that the filling time approaches three seconds with an increase in the size of the molding machine. If the molding machine has the properties described above, injection can be completed in 0.2 to 3 seconds in usual. In the present invention, the high-speed injection is not limited to the first embodiment but may be employed in a third embodiment.

It will be understandable that the molding machine for the high-speed injection herein specified is extraordinarily different in size from small-sized molding machines for injection-foaming molding processes for manufacturing containers for instant foods referred to as cup noodles, for example, small-sized molding machines disclosed in JP-A-2001-198943 and other documents and the high-speed injection is greatly different in feasibility from ordinary "high-speed injection" performed using such small-sized molding machines.

The reason why the high-speed injection is necessary for the injection-foaming molding process is to prevent a foaming gas, confined in the molten resin, from being released from a flow front during the injection. According to the high-speed injection, the amount of the released foaming gas can be reduced, the temperature of the injected resin can be prevented from being decreased, and the thickness of the skin layer can therefore be reduced. In this embodiment, the term "skin layer" is defined as a thin surface layer formed by cooling a surface portion of the molten resin in contact with the mold.

Step (b)

The mold is opened immediately after the injection is completed. The term "a preset position for achieving a predetermined opening stroke" is defined as a position for achieving a final size designed for the article to be formed based on the foaming magnification. The opening operation is continuously performed by moving the mold to a position for achieving the final size. The opening speed is preferably high, but varies depending on the viscosity, surface tension, and foaming magnification of the molten resin. Since nuclei of foams grow slowly when the molten resin has high viscosity, the skin layer is peeled off from the cavity wall when the opening speed is excessively large. When the foaming magnification is high, the foaming rate is decreased at the end of a foaming step because the pressure of the formed foams is decreased. If the opening speed is greater than the foaming rate, the skin layer is peeled off from the cavity wall. Therefore, the opening speed is preferably high as long as the skin layer is not peeled off from the cavity wall.

In the case that the molten resin has low surface tension, when the opening speed is excessively high, there is a problem in that microcells coalesce to form giant cells in some cases because the partition-forming force (tension) of the resin is less than the pressure of the foaming gas. When the opening speed is low, the foaming magnification is decreased and/or defects such as sink marks are formed on the surface of the formed article in some cases because the molten resin that is in contact with the mold is rapidly cooled and therefore solidified and the resulting resin does not foam. Therefore, the opening speed must be controlled within a desired range.

Steps (c) and (d)

Step (c) corresponds to a cooling step. After the preset cooling time is elapsed, Step (d) is performed. Step (d) corresponds to a step of demolding the formed article. In Step (d), the mold is fully opened and the formed article is demolded therefrom with a article-removing device (ejector).

FIG. 1 is a time chart showing the steps described above. The injection-foaming molding process according to the first embodiment of the present invention will now be described with reference to FIG. 1.

(1) The mold that is in a fully opened state (Point A) is clamped and then maintained in a state (Point B) that a clamping force is applied to the mold (the same state as that of an ordinary injection molding process).

(2) High-speed injection is started. Conditions are set such that the injection time ranges one to three seconds.

(3) After the injection is completed (Point C), the mold is immediately opened. The opening speed is maximized as long as the skin layer is not peeled off from the cavity wall. The opening operation is stopped at Point D (a foaming step). The opening stroke is determined depending on the foaming magnification (the size of the formed article).

(4) The period from Point D to Point E corresponds to a cooling period. After a predetermined cooling time is elapsed, the mold is opened (Point F) and the formed article is demolded therefrom.

Between the steps described above, Steps (i) and (ii) are performed at a predetermined timing. A procedure for discontinuing the mold cavity from the resin-reserving section placed at the front end of the screw is described below. After the injection is completed (Point C), the shut-off nozzle (valve gate) is immediately manipulated to discontinue the mold cavity from the resin-reserving section.

The pressure of the resin in the resin-reserving section is adjusted to a value suitable for the charging by performing the forward motion of the screw during the period from the completion of injecting the resin into the mold cavity to the start of the charging. The charging is started by allowing the screw to run and the screw is stopped when a charging reaches a predetermined value.

As shown in FIG. 1, a packing pressure (peak pressure) is created in the resin placed in the mold cavity when the injection is completed (Point c). Foaming can be prevented from occurring at the flow front by the packing pressure and the formed article therefore has good appearance.

A mold-opening control device for precisely controlling the operation of opening or closing the mold is described below.

Examples of the mold-opening control device, which can be used in the first to third embodiments of the present invention, include a toggle clamping unit equipped with a plurality of toggle arms connected to a crosshead. In usual, some injection molding machines include such a toggle clamping unit. The position of the crosshead is controlled based on a predetermined signal so that the clamping force is maintained constant, in a step of injecting a resin into a cavity of a mold placed in an injection molding machine, then the mold is opened until a predetermined opening stroke, at a step of foaming after the completion of injection of the resin. The crosshead can be controlled by adjusting the position thereof in such a manner that the mold is opened until a predetermined opening stroke is achieved when, for example, the screw running forward reaches a predetermined point.

The injection molding machine including the control device is described with reference to FIG. 4. Examples of the machine include an injection-foaming molding machine including a toggle clamping unit equipped with a plurality of toggle arms connected to a crosshead; a driving link for driving the toggle clamping unit with the crosshead placed therebetween; a clamping device for freely opening or closing a mold, placed between a fixed platen and a movable platen connected to an end of the toggle clamping unit, by allowing the movable platen to move toward or away from the fixed platen; and a control device. The control device receives a signal output from a stroke sensor for detecting the opening stroke of the mold, a signal output from a clamping-force sensor for detecting the clamping-force of the clamping device, and a signal output from a position sensor for detecting the position of the crosshead; detects the position of the crosshead as a mold touch point with the clamping-force sensor when the clamping force starts to increase due to the operation of closing the mold; and stores data on the opening stroke and clamping force of the mold which are determined by moving the crosshead, placed at the mold touch point, forward or backward and which therefore correspond to the position of the crosshead. In the injection-foaming machine, the opening stroke of the mold and the clamping force applied to the mold that has not been filled with a resin yet are controlled depending on the position of the crosshead based on the stored data.

The molding machine determines the increase in clamping force from a measurement obtained with the stroke sensor and the distance traveled by the crosshead, the distance being necessary to reduce the increase in clamping force, based on the stored data on the clamping force corresponding to the position of the clamping force when the mold filled with the resin is opened. Therefore, the molding machine can control the position of the crosshead such that the clamping force applied to the mold filled with the resin becomes the same as that applied to the mold that has not yet been filled with the resin. The driving link is preferably driven by an electric servomotor.

In the present invention, the control device is useful in the second and third embodiments in particular because the control device can control the clamping device to clamp the mold with a clamping force insufficient to allow wear to remain on the surface of the formed article.

As described above, the injection-foaming machine useful in the present invention includes the toggle clamping unit equipped with the toggle arms connected to the crosshead; the driving link for driving the toggle clamping unit with the crosshead placed therebetween; the clamping device for freely opening or closing the mold, placed between the fixed platen and the movable platen connected to an end of the toggle clamping unit, by allowing the movable platen to move toward or away from the fixed platen; and the control device that receives a signal output from the stroke sensor for detecting the opening stroke of the mold, a signal output from the clamping-force sensor for detecting the clamping-force of the clamping device, and a signal output from the position sensor for detecting the position of the crosshead, detects the position of the crosshead as the mold touch point with the clamping-force sensor when the clamping force starts to increase due to the operation of closing the mold, and stores data on the opening stroke and clamping force of the mold which are determined by moving the crosshead, placed at the mold touch point, forward or backward and which therefore correspond to the position of the crosshead. The injection-foaming machine controls the opening stroke of the mold and the clamping force applied to the mold depending on the position of the crosshead based on the stored data.

When the injection-foaming molding machine is operated, the molding machine determines the increase in clamping force from a measurement obtained with the stroke sensor and the distance traveled by the crosshead, the distance being necessary to reduce the increase in clamping force, based on the stored data on the clamping force corresponding to the position of the clamping force when the mold filled with the resin is opened. The molding machine can therefore control the position of the crosshead such that the clamping force applied to the mold filled with the resin becomes the same as that applied to the mold that has not yet been filled with the resin.

The molding machine preferably includes the electric servomotor for driving the driving link as described above.

Figure 5:
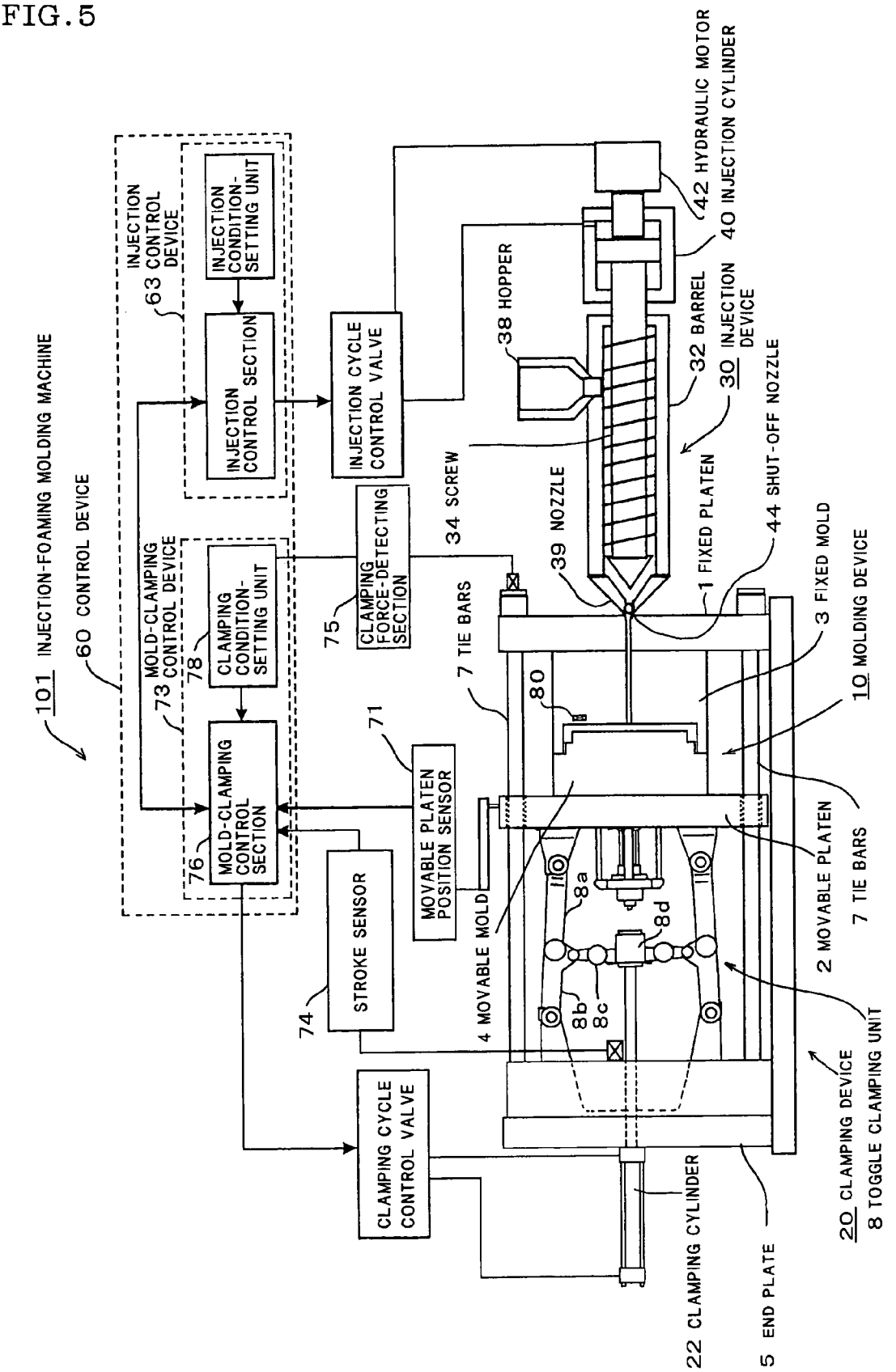
FIG. 5 is a schematic view showing an entire configuration of another injection-foaming molding machine useful in performing a process according to the present invention.
Figure 6:
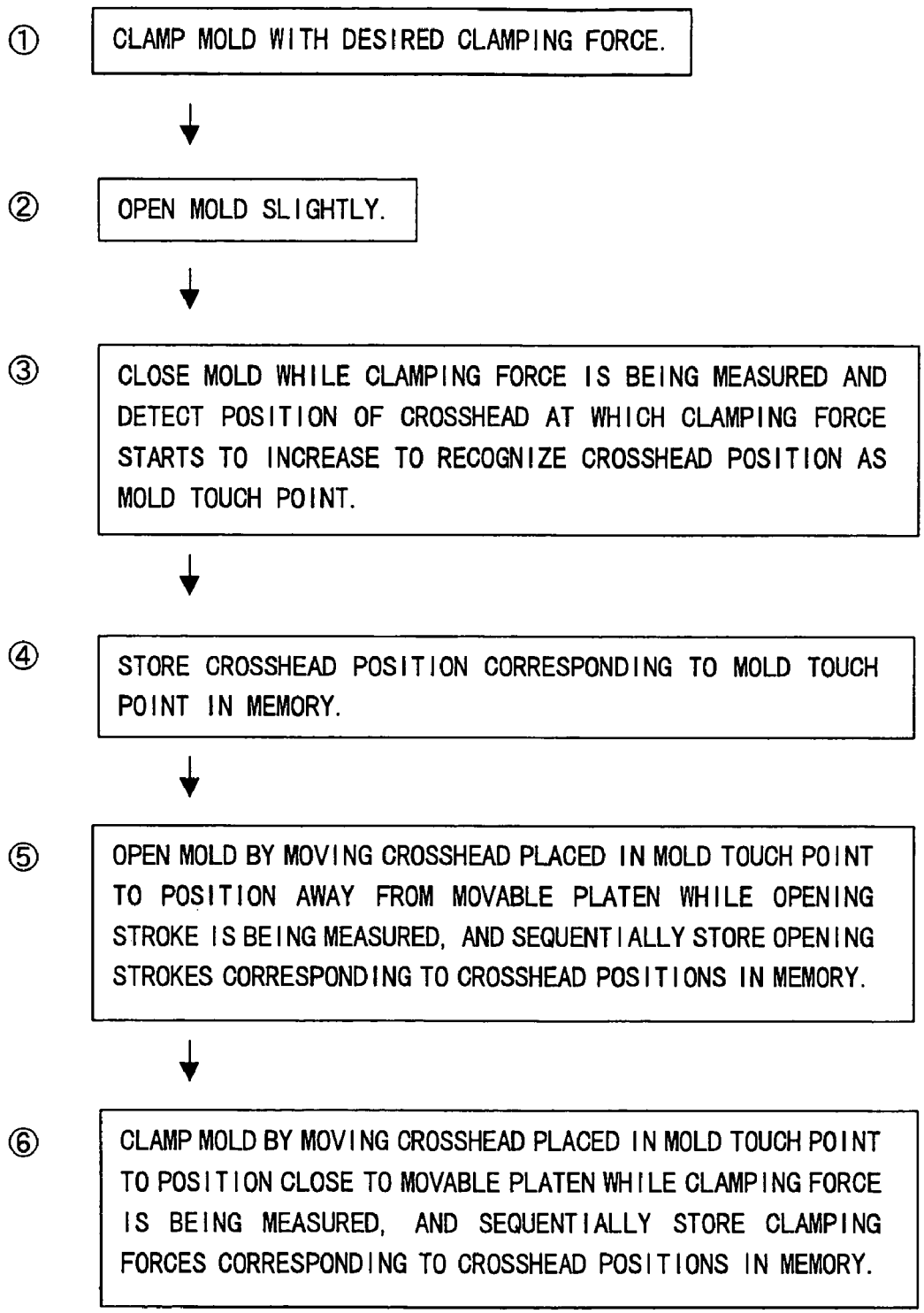
FIG. 6 is a flowchart illustrating a procedure of a teaching operation.

The operation of the molding machine will now be further described in detail with reference to the figure. FIG. 4 is a schematic view showing an entire configuration of the injection-foaming molding machine used for the injection-foaming molding process of the present invention. FIG. 5 is a schematic view showing an entire configuration of another injection-foaming molding machine used for the injection-foaming molding process of the present invention. FIG. 6 is a flowchart illustrating a procedure of a teaching operation for storing data on the opening stroke and clamping force corresponding to the position of the crosshead during the operation of the molding machine.

Figure 4:
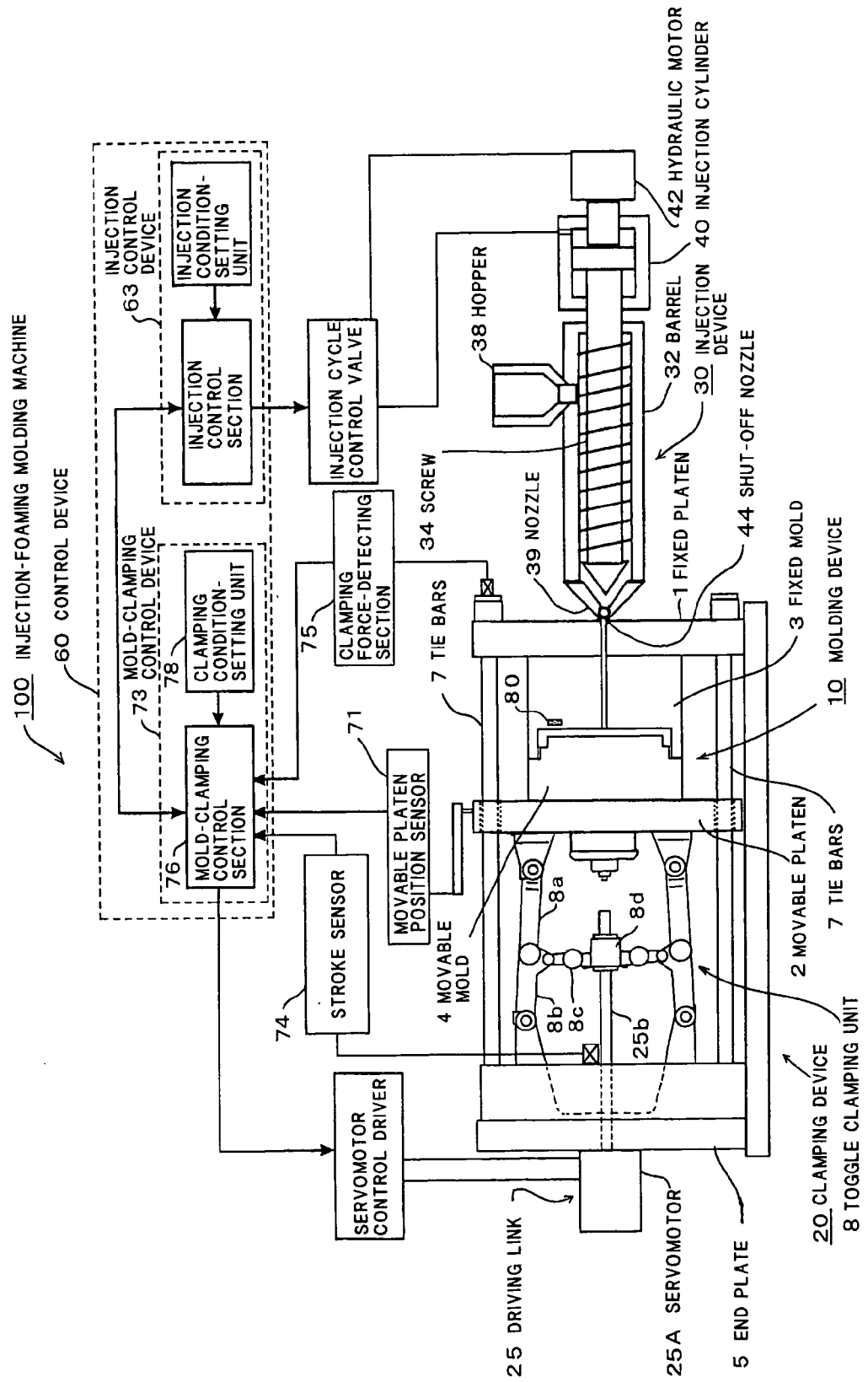
FIG. 4 is a schematic view showing an entire configuration of an injection-foaming molding machine useful in performing a process according to the present invention.

The injection-foaming molding machine 100 shown in FIG. 4 includes a clamping device 20, an injection device 30, a control device 60 for controlling the clamping device 20 and the injection device 30, and a molding device 10 (which can be referred to as a mold 10) connected to the clamping device 20.

A configuration of the molding device 10 that can be used in the present invention will now be described.

With reference to FIG. 4, the molding device 10 includes a male-type fixed mold 3 (which can be referred to as a fixed mold 3) and a female-type movable mold 4 (which can be referred to as a movable mold 4). The fixed mold 3 and the movable mold 4 are fitted to each other at a fitting portion having a landed structure. A sub-cavity present in the fixed mold 3 and a sub-cavity present in the movable mold 4 are incorporated into a mold cavity in such a manner that the fixed mold 3 and the movable mold 4 are fitted to each other. The fitting portion (which can be referred to as a landed portion) having the landed structure surrounds the mold cavity. The landed portion prevents a resin packed in the mold cavity from leaking from the molding device 10.

The fixed mold 1 has a hole which is not shown, which extends from a face opposite to the mold cavity toward the mold cavity, and in which a thermocouple can be placed. The molding device 10 includes a temperature sensor 80 that is placed at a region in the hole, the region being 5 mm apart from the mold cavity. In the molding device 10, the temperature of a portion close to the mold cavity can be measured with the temperature sensor 80, and obtained data on the temperature of the portion close to the mold cavity is input to the control device 60.

A purpose of using the temperature sensor 80 is to detect the surface temperature of the packed resin. The inventors have found that the temperature of a mold portion close to the mold cavity varies depending on the surface temperature of the packed resin and have made an attempt to estimate a change in the surface temperature of the packed resin by measuring the temperature of the mold portion close to the mold cavity. The injection-foaming molding machine shown in FIG. 4 includes the temperature sensor 80 for measuring the temperature of the mold portion close to the mold cavity. In the present invention, the kind of the temperature sensor 80 and a method for providing the temperature sensor 80 are not limited to the above, and the kind thereof and the method may be modified within a scope of the present invention. Furthermore, the surface temperature of the formed article may be directly measured if possible.

The molding device 10 shown in FIG. 4 has the landed structure that prevents the resin packed in the mold cavity from leaking from the mold when the mold is opened until a predetermined stroke is achieved. The present invention is not limited to the molding device, and any mold useful in injection foaming process, for example, a mold having a parting structure can be used.

The clamping device 20 included in the injection-foaming molding machine 100 includes a movable platen 2, a fixed platen 1, a driving link 25 driven by an electric servomotor 25A (which can be simply referred to as a servomotor) functioning as a driving motor, a toggle clamping unit 8 (which can be referred to as a toggle link-type clamping unit) driven by the driving link 25, a servomotor-controlling driver for driving the electric servomotor 25A, an end plate 5, and tie bars 7 placed between the fixed platen 1 and the end plate 5. The movable platen 2 is guided by the tie bars 7 and moved forward or backward together with the movable mold 4 by the toggle clamping unit 8. Examples of the driving motor include a hydraulic motor other than the servomotor.

The injection-foaming molding machine shown in FIG. 5 further includes a stroke sensor 74, connected to a crosshead-driving shaft 25b included in the driving link 25, functioning as a position sensor for detecting the position of a crosshead 8d. The position of the crosshead 8d can be precisely detected using the stroke sensor 74.

The injection-foaming molding machine shown in FIG. 5 further includes the stroke sensor 74 for detecting the position of the crosshead 8d. A position sensor for detecting the position of the crosshead 8d is not limited to the stroke sensor 74 and a sensor for directly detecting the position of the crosshead 8d may be used.

The injection-foaming molding machine 100 further includes a clamping force-detecting section 75, connected to ends of the tie bars 7, functioning as a sensor for detecting the clamping force. The clamping force-detecting section 75 detects the clamping force by determining the elongation of the tie bars 7.

The injection-foaming molding machine 100 further includes a movable platen-positioning sensor 71 for detecting the opening stroke. The movable platen-positioning sensor 71 detects the position of the movable platen 2 and can determine the opening stroke of the molding device 10 by processing an obtained measurement with a control device described below.

The injection-foaming molding machine shown in FIG. 5 includes the clamping force sensor and the stroke sensor described above. The present invention is not limited to those two sensors and the following sensors may be used: a clamping force sensor for determining the clamping force by measuring the elongation of a component other than the tie bars and a stroke sensor for directly measuring the opening stroke of the molding device 10.

The control device 60 for controlling the operation of the injection-foaming molding machine 100 includes a control device 60, which receives data output from the movable platen-positioning sensor 71 for detecting the position of the molding device 10, data output from the clamping force-detecting section 75 for detecting the opening stroke of the clamping device 20, and data output from the stroke sensor 74 for detecting the position of the crosshead 8d; detects the position of the crosshead 8d at the moment when the clamping force is increased by closing the mold with the molding device 10 to recognize the position as a mold touch point; and stores data on the opening stroke and clamping force of the mold that are determined by moving the crosshead 8d, located at the mold touch point, forward or backward and therefore depend on the position of the crosshead 8d.

The toggle clamping unit 8 shown in FIG. 4 includes the crosshead 8d, couplers 8c, and a plurality of toggle arms (8a, 8b, and so on) connected to the crosshead 8d with the couplers 8c each placed therebetween and rotates the crosshead-driving shaft 25b of the driving link 25 connected to the crosshead 8d to move the toggle arms 8b to control the movement of the movable platen 2 and the clamping force.

The clamping device 20 shown in FIG. 4 is driven by electricity and is referred to as an electric toggle link type. The clamping device 20 may be replaced with a hydraulic clamping device.

A configuration of the injection device 30 included in the injection-foaming molding machine 100 is described below. The injection device 30 includes a barrel 32; a screw 34, placed in the barrel 32, having a screw flight; a hopper 38 for feeding a core resin to the barrel 32; a injection cylinder 40 for moving the screw 34 forward or backward; a hydraulic motor 42 for rotating the screw 34; and a hydraulic source for applying a desired hydraulic pressure to the injection cylinder 40 and the hydraulic motor 42. A heater, which is not shown, is placed on an outer face of the barrel 32.

In the injection device 30, the screw 34 is driven by the hydraulic motor 42, whereby the core resin of a pellet-like shape is fed to the barrel from the hopper 38. The fed core resin of a pellet-like shape is heated by the heater attached to the barrel 32, subjected to kneading and compression by the rotation of the screw 34, melted thereby, and then moved ahead of the screw. The hydraulic motor 42 may be replaced with an electric servomotor.

The molten core resin moved ahead of the screw 34 can be discharged from a nozzle 39, located at the top of the barrel 32, by the screw 34 driven forward by the injection cylinder 40.

In order to maintain the pressure of the resin placed at the front end of the barrel at a value equal to or higher than the back pressure before the start of the charging, the pressure of the resin is positively increased by driving the screw forward to apply a pressure to the resin placed between the top of the barrel and a shut-off nozzle 44 as described above. The present invention is are not limited to such a procedure, but one may employ, for example, a procedure for holding the position of the screw during the period from the completion of injection to the start of the charging to prevent a high pressure, applied to the resin placed between the portions described above during the discharge thereof, from being dropped.

The control device 60 includes a clamping device-controlling section 61 for controlling the clamping device, a clamping condition-setting unit for setting clamping conditions, an injection control section 63 for controlling the injection device, and an injection condition-setting unit for setting injection conditions.

The operation of the injection-foaming molding machine will now be described, the machine being useful to control the opening stroke in the first to third embodiments of the present invention.

First of all, a teaching step of detecting the opening stroke and clamping force of the molding device 10 corresponding to the position of the crosshead 8d to store those data is performed in preparation for formed article.

The teaching step is necessary when the molding device 10 is changed. In the teaching step, the control device 60 stores data on the opening stroke and clamping force of the molding device 10 that correspond to the position of the crosshead 8d and vary depending on the thickness of the molding device 10 placed in the clamping device 20.

FIG. 6 illustrates a procedure, conducted in the teaching step, for measuring data on the opening stroke and clamping force corresponding to the position of the crosshead 8d.

The molding device 10 is clamped with an arbitrary clamping force by moving the crosshead 8d toward the movable platen 2 (this movement can be referred to as a forward movement) and then opened by moving the crosshead 8d away from the movable platen 2 (this movement can be referred to as a backward movement). The molding device 10 is opened until a preset opening stroke for the teaching step is achieved, and the opening operation is then stopped.

The crosshead 8d is moved forward while the clamping force is being detecting with the clamping force-detecting section 75, whereby the mold is closed again at a low speed with a weak force. A clamping force is created by closing the molding device 10 and the tie bars 7 are thereby elongated. This creates a change in a signal output from the clamping force-detecting section 75. The control device 60 processes the output signal input to the control device 60 to determine the clamping force and detects a point of time when the clamping force starts to increase to recognize the point as a mold touch point, which is stored in a memory portion (which can be simply referred to as a memory) placed in a clamping device-controlling section 76 included in the control device 60.

In an actual operation, it is substantially impossible to detect a minute clamping force to identify a point of time when the clamping force starts to increase. In view of the device accuracy, the point of time when the clamping force starts to increase is preferably defined as a point of time when the clamping force exceeds a preset slight value. It is preferable that the clamping force be preset to three tonf (about 29400N) or below and a point of time when the clamping force exceeds this value be defined as the mold touch point.

Figure 2:
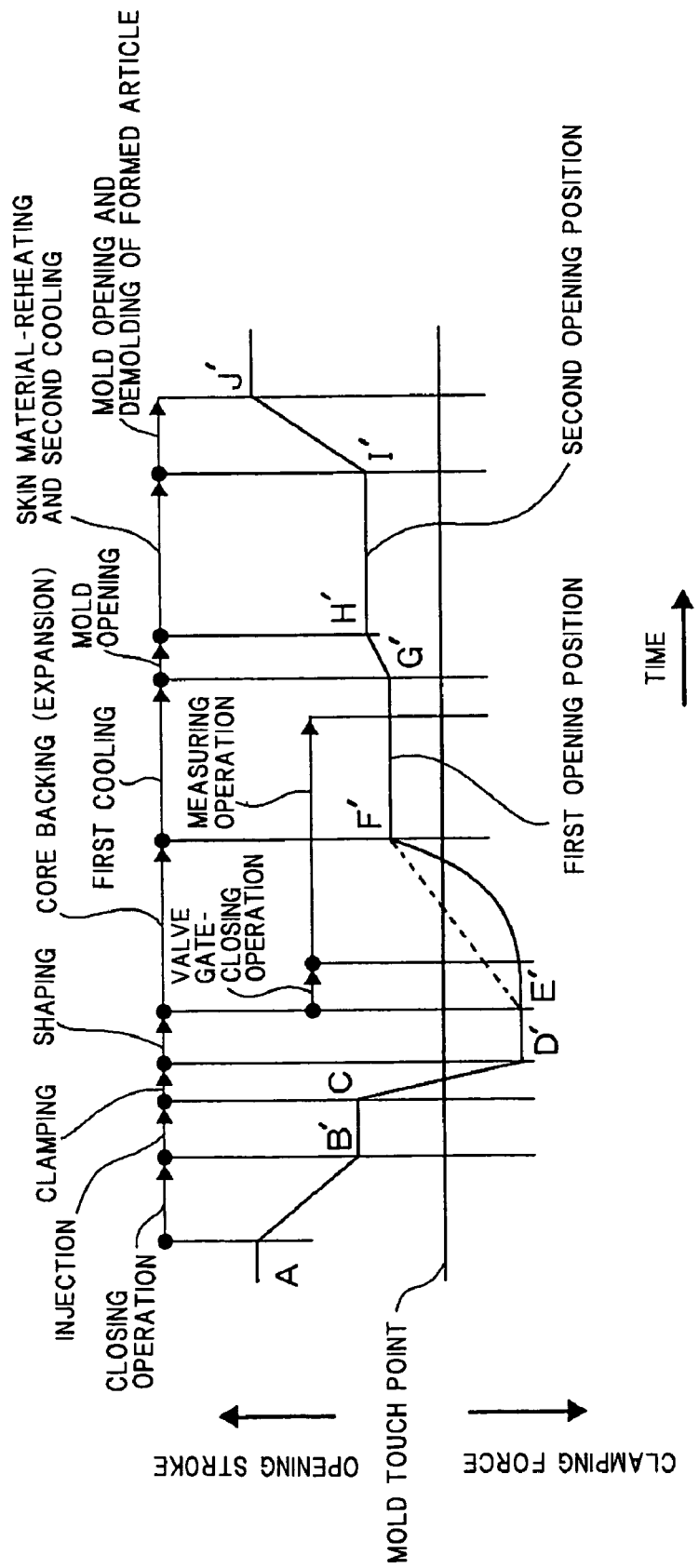
FIG. 2 is a chart showing the relationship between an injection operation and a mold-opening operation in a molding cycle of a second embodiment according to the present invention.
Figure 3:
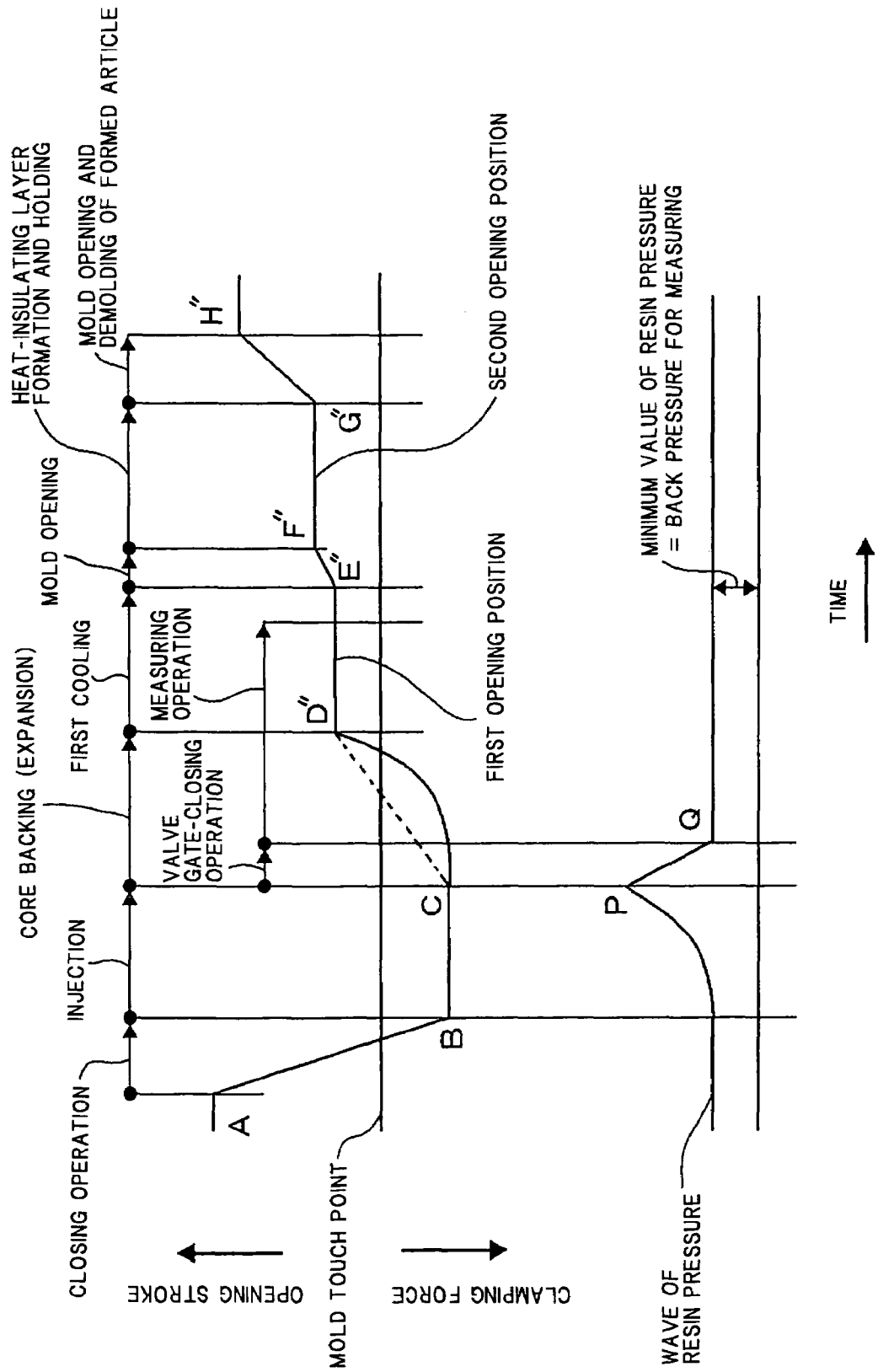
FIG. 3 is a chart showing the relationship between an injection operation, a mold-opening operation, and the pressure of resin in a molding cycle of a third embodiment according to the present invention.

In view of the sliding resistance of the machine and the measurement accuracy of the clamping force-detecting section 75 for detecting the clamping force based on the elongation of the tie bars 7, a point of time when the clamping force reaches two tonf (about 19600 N) may be defined as the mold touch point. The mold touch point shown in FIGS. 1 to 3 is defined as a position above which a point located shows that the mold is opened.

The control device 60 processes an output signal on the mold touch point detected by the movable platen-positioning sensor 71 and a signal output from the stroke sensor 74. The opening stroke and clamping force determined by moving the crosshead 8d, located at the mold touch point, forward or backward are converted into data on the opening stroke and clamping force corresponding to the position of the crosshead, and the data is sequentially stored in the memory of the control device 60.

The teaching step is terminated at a point of time when data necessary for injection-foaming molding is obtained.

Since the mold cavity is sealed with the fitting portion, placed between the fixed mold 3 and the movable mold 4, having the landed structure even if the molding device 10 is slightly opened, the molten resin placed in the mold cavity does not leak out of the molding device 10.

In the foaming step subsequent to the completion of the resin injection, the position of the crosshead is controlled based on data on the opening stroke of the molding device 10 corresponding to the crosshead 8d, the opening stroke being stored in the control device 60 in the teaching step such that the molding device 10 can be opened until a desired opening stroke is achieved, whereby a formed article having a desired foaming magnification is prepared.

Just before the mold members of the molding device 10 touch each other, the ratio of the moving stroke of the movable platen 2 to that of the crosshead is about ten to one and the ratio of the moving speed of the movable platen 2 to that of the link is also about ten to one.

In other words, when the position of the crosshead 8d is controlled with the clamping device 20 including the toggle clamping unit, the position of the movable platen 2 can be controlled with an accuracy ten times higher than the accuracy with which the position of the crosshead is controlled, that is, the opening operation can be controlled with high accuracy.

Ordinary injection-foaming molding processes for allowing resins to foam by increasing the cavity volume have a problem in that differences in foaming magnification occur in prepared articles depending on a difference in how to open the mold. However, in the present invention, the opening operation can be controlled with high accuracy without using a high-accuracy positioning device or speed control device as described above; hence, a good formed article can be formed by expanding the cavity.

For the molding device, even if a hydraulic cylinder is used as a source for driving the crosshead 8d, the control can be performed with an accuracy ten times higher than the accuracy with which the hydraulic cylinder is controlled, whereby a good formed article can be obtained.

However, an embodiment in which the driving link 25 driven by the electric servomotor 25A is used is more preferable than an embodiment in which the hydraulic cylinder is used because the electric servomotor 25A is not substantially affected by ambient conditions such as the oil temperature and high-accuracy control can therefore be performed.

In a known injection-foaming molding machine including a known toggle clamping unit having an advantage in that the control of the opening stroke is satisfactory but a disadvantage in that the opening stroke cannot be maintained constant during the resin injection, the high-accuracy control described above cannot be performed. However, in the present invention, the high-accuracy control can be performed.

In the injection-foaming molding machine used in the present invention, the control device 60 stores the data on the opening stroke and clamping force of the mold that correspond to the position of the crosshead in advance in the teaching step and the clamping device 20 is controlled based on the stored data; hence, the problems described above can be overcome.

In the first embodiment, a 2-mm or less formed article that has not been substantially formed hitherto can be formed by controlling the moving stroke and speed of the movable platen 2 with high accuracy using the toggle clamping unit, adjusting the foaming magnification based on the moving stroke of the movable mold 4, and adjusting the thickness of the skin layer and the cell size based on the timing of switching and the moving speed.

As described above, surface roughness referred to as swirl marks can be prevented by controlling the mold-opening control device in the step of injecting the molten resin, whereby an article having a clean surface can be obtained. Since the pressure gradient ranging from the gate portion to final injection point of the article to be formed that has not been allowed to foam is small, a formed article that is uniform in foaming magnification and has a skin layer with a uniform thickness can be obtained. Furthermore, even if a portion of the resin is not allowed to remain at the front end of the screw in the injection cylinder, a pressure can be applied to a portion of the resin in the mold by clamping the mold with a predetermined clamping force until a portion of the resin in the mold is subjected to the foaming step. Therefore, there is no problem in that a portion of the resin remaining at the front end of the screw in the injection cylinder has broken bubbles; hence, the process of this embodiment has a great advantage.

In particular, when the injection step is switched to the foaming step based on a signal output from the temperature sensor placed close to the mold cavity, a difference in time for forming the skin layer can be coped with, the time difference being caused by a difference in resin temperature due to a change in the state of the plasticated. Therefore, a great advantage that the formed articles can be continuously formed with high reproducibility can be obtained.

Furthermore, since data on the opening stroke and clamping force of the mold that correspond to the position of the crosshead is stored in the control device in the teaching step in advance and the clamping device is controlled based on the stored data, the following problems that are characteristic of known processes can be prevented from occurring in formed articles: serious differences in foaming magnification, cell diameter, skin layer thickness, and/or the like. Therefore, formed articles of good quality can be formed by expanding the cavity.

When an injection-foaming molding machine equipped with a driving link driven by an electric servomotor that is not affected by the oil temperature is used in particular, formed articles of good quality can be manufactured with high reproducibility.

A second embodiment relates to an injection-foaming molding process which is of a so-called injection compression type and in which after a mold including a pair of mold members that face each other and have a skin material placed therebetween is closed by moving one of the mold members to a first closing position, a molten resin containing a foaming agent is injected into a cavity of the mold that is defined by the skin material and the mold, the mold is clamped by moving the mold to a final closing position, and the resulting resin is allowed to foam by opening the resulting mold to expand the cavity, thereby manufacturing a formed article including the skin material and the resin having a foaming layer, the skin material and the resin being integrated into one pieces. The process includes the following steps (a) to (g) in addition to Steps (i) and (ii):

(a) a step of fixing a skin material to one of a pair of mold members, arranged vertically or horizontally, facing each other;

(b) a step of closing a mold by moving one of the mold members to a predetermined position in a closing stroke to hold the mold in the position;

(c) a step of injecting a molten resin containing a foaming agent into a cavity of the mold that is defined by the skin material and the mold to fill the cavity therewith;

(d) a step of clamping the mold by moving the movable mold to a final clamping position at a predetermined clamping speed immediately after the completion of the injection to form an article;

(e) a step of continuously opening the mold by moving the movable mold to a first opening position for achieving a preset opening stroke to hold the mold for a predetermined period of time;

(f) a step of further opening the mold by moving the movable mold to a second opening position for achieving a preset opening stroke to hold the mold for a predetermined period of time, this step being subsequent to the operation of holding the mold in the first opening position; and (g) a step of fully opening the mold to demold the formed article from the mold.

In Step (b), the mold is preferably held in a position for achieving an opening stroke of 5 to 50 mm, and the mold is preferably clamped by moving the movable mold to the final clamping position at a clamping speed of 20 to 70 mm/sec immediately after the completion of the injection.

For the second embodiment, the following relationship and outline are described below with reference to FIG. 2 showing the steps of the present invention with a time chart, in advance of individual descriptions of Steps (a) to (g): the relationship between the control (the control of the clamping force and the opening stroke) of the mold position and foaming/lamination molding and outlines of the steps (a foaming/lamination injection molding process that is of an injection press type).

(1) In the mold that is in a fully opened state (Point A), the skin material is fixed to one of the mold members. The skin material need not be fixed thereto in such a manner that the mold is in a fully opened state but may be fixed thereto at the midst of closing the mold.

(2) The mold is closed by moving one of the mold members to a predetermined position in a closing stroke and then held in the position (Point B'). The position to which the mold is moved to close the mold corresponds to the first opening position.

(3) The molten resin containing the foaming agent is injected into the mold cavity defined by the skin material and the mold members to fill the cavity therewith. In order to prevent the resin from foaming at the atmosphere pressure, the injection time is minimized.

(4) The mold is clamped by moving the mold to a final clamping position (Point D') at a predetermined clamping speed immediately after the completion of the injection, the formed article is thereby formed (press molding), and the mold is held in a clamped state for a predetermined period of time (the period from Point D' to Point E' corresponds to a shaping time).

(5) The mold is continuously opened by moving the mold to the first opening position (Point F') for achieving a preset opening stroke and then maintained in this state for a predetermined period of time. The period from Point F' to Point G' corresponds to a first cooling period. After the predetermined period is elapsed, in order to form an air-containing, heat-insulating layer, the mold is slightly opened (Point H').

(6) The period from Point G' to Point H' corresponds to a second opening step. In order to form the air-containing, heat-insulating layer, the mold is slightly opened. The position to which the mold is moved to slightly opening the mold is defined as a second opening position.

(7) The period from Point H' to Point I' corresponds to a second cooling period in which the skin material is reheated. After a predetermined time is elapsed, the mold is opened (Point J').

(8) The period from Point I' to Point J' corresponds to another opening step. The mold is fully opened and the formed article is then demolded therefrom with a formed article-removing device (an ejector).

The steps of this embodiment will now be described in detail with reference to FIG. 2.

Steps (a) to (c)

Step (a) corresponds to a step of fixing the skin material to one of a pair of the mold members while the mold is maintained opened. Step (b) corresponds to a step of closing the mold by moving the mold to a predetermined closing position to hold the mold in this position. The predetermined closing position is described below. In this embodiment, there is employed a so-called injection press molding process wherein the skin material is fixed to one of the mold members while the mold is maintained opened, and the molten resin containing the foaming agent is then injected into the cavity of the mold maintained opened. An object of this process is to reduce the thermal load and mechanical load to be applied to a portion of the skin material close to a gate section in the injection step to prevent irreparable damage such as wear from occurring in the skin material. The opening stroke suitable to the object is assumed to be within a range of 5 to 50 mm based on various test results. The opening stroke can be referred to as the first closing position.

Step (c) is described below. In this step, the volume of the resin injected into the mold cavity is equal to a volume determined by adding the resin volume reduced due to cooling and solidification (a difference between the volume of the resin maintained at a molding temperature and that of the resin cooled to room temperature) to the volume of the cavity of the mold which has been fully closed and in which the resin has not been allowed to foam (in just packing state).

Steps (d) to (e)

Step (d) corresponds to a step of clamping the mold by moving the mold to the final clamping position at high speed immediately after the completion of the injection, shaping the molten resin into a formed article, and then cooling the formed article to a temperature at which the formed article is not deformed. The period from the start of the injection to the completion of closing the mold is critical; hence, high-speed injection and high-speed clamping are essential. Therefore, before the injection is not completed, the clamping of the mold may be started during the injection.

On the other hand, the clamping speed is preferably high. In actual, the clamping speed preferably ranges from 20 to 70 mm/sec and more preferably 30 to 70 mm/sec. The upper limit of the clamping speed is determined in view of the current technical level and mechanical cost. If there are no technical problems, the clamping speed may be higher than the above-mentioned upper limit.

Step (e) is described below. The first opening position for achieving a preset opening stroke is defined as a position for allowing the formed article to have a final size determined depending on the foaming magnification of the formed article. The mold is continuously opened by moving the mold to the final opening position; that is, the control of the opening speed at the time of core-backing step is carried out. The opening speed is determined in view of heat-insulating properties of the skin material and the state of the skin layer as described below. The skin layer herein specified is defined as a non-cellular layer formed by solidifying a portion of the core resin in contact with the mold or the skin material. A skin layer specified in the third embodiment described below has substantially the same definition as that of the skin layer described in this embodiment.

Since it takes much time to form the skin layer because of the heat insulation of the skin material, a procedure for opening the mold is as illustrated by a parabolic pattern indicated by the solid line extending from Point E' to Point F' shown in FIG. 2. The reason for employing such a procedure is to promote the formation of the skin layer by opening the mold at low speed in an initial stage of the opening operation. On the other hand, since foaming must be completed while the molten resin has a viscosity suitable to foaming, the mold must be opened at high speed in an end stage of the opening operation.

Step (e) includes the first cooling period, in which the mold is held in the first opening position for a predetermined period. The predetermined period is described below.

In Step (e), the technique disclosed in JP-A-11-147235 is employed.

After the injection of the core resin is completed, the skin material is cooled depending on progress in the solidification of the core resin. However, since a space functioning as an air-containing, heat-insulating layer is formed, the skin material is reheated due to the amount of heat in the core resin, whereby the temperature of the skin material is increased again. The following-time must be investigated and confirmed by making a trial run for determining molding conditions in advance because the heat-insulating layer is formed: the time elapsed until the temperature of the core resin reaches a predetermined value in a temperature range (melting point Tm to glass transition point Tg) in which the skin material has rubber elasticity.

Since the load applied to the skin material is reduced to zero and the space for healing is formed, heat is prevented from being transmitted from the skin material to the mold. Therefore, even if the skin material is cooled to a temperature less than or equal to the glass transition point Tg, the skin material is reheated, due to the amount of heat in the core resin, to a temperature in a temperature range from the melting point Tm to the glass transition point Tg in which the skin material has rubber elasticity. Since the mold is maintained in this state for a predetermined period of time, the surface layer of the skin material deformed by an external force applied thereto during molding is healed due to the elasticity. Therefore, the texture of the skin material is maintained after molding. In this step, the core resin is sufficiently cooled and solidified because the melting point T'm of the core resin is higher than the glass transition point Tg of the skin material.

After this predetermined time is elapsed, Step (f) of slightly opening the mold is performed.

The space (air-containing, heat-insulating layer) is formed between the skin material and the cavity wall by slightly opening the mold. This space functions as the air-containing, heat-insulating layer for preventing heat from being transmitted from the core resin to the cavity wall. Therefore, the skin material is reheated, due to the latent heat of the core resin, to a temperature higher than the glass transition point of the skin material. Since the temperature of the skin material is increased, due to the employment of this step, the skin material damaged in Step (d) is self-healed due to elasticity inherent in resin. Therefore, the resulting skin material has the same texture as that of the skin material before shaping step.

Step (g) corresponds to a step of removing the formed article from the mold. In this step, the mold is fully opened and the formed article is demolded therefrom with the formed article-removing device (ejector).

Since Steps (i) and (ii) are common to every embodiment, detailed descriptions thereof are omitted in this embodiment.

A third embodiment relates to an injection-foaming molding process which is of a so-called injection compression type and in which after a mold including a pair of mold members that face each other and have a skin material placed therebetween is clamped, a molten resin containing a foaming agent is injected into a cavity of the mold that is defined by the skin material and the mold members, and the resin is allowed to foam by opening the mold to expand the cavity, thereby an article formed by foaming is formed; said article comprising the skin material and the resin having a foaming layer both of which have been integrated into one piece. The process includes the following steps (a) to (h) in addition to Steps (i) and (ii):

(a) a step of fixing a skin material to one of a pair of mold members, arranged vertically or horizontally, facing each other;

(b) a step of clamping a mold by moving one of the mold members to a predetermined clamping position;

(c) a step of injecting a necessary amount of a molten resin containing a foaming agent into a cavity of the mold in a preset time, the cavity having a volume equal to that determined by subtracting the resin volume reduced due to cooling and solidification from the volume of the injected resin;

(d) a step of continuously opening the mold by moving the mold to a first opening position for obtaining a preset opening stroke immediately after the completion of the injection;

(e) a step of holding the mold in the first opening position for a predetermined period of time;

(f) a step of opening the mold by moving the mold to a second position for obtaining a preset opening stroke after the termination of the mold-holding step;

(g) a step of holding the mold in the second position to heal the damaged skin material; and (h) a step of fully opening the mold to demold a formed article therefrom.

In Step (c) of this embodiment, a necessary amount of the molten resin containing the foaming agent is preferably injected into the mold cavity, which has a volume equal to that determined by subtracting the resin volume reduced due to cooling and solidification from the volume of the injected resin, in three seconds. It is preferable to use a skin material capable of decorating at least one part of a surface of the formed article.

With referring to FIG. 3 showing the steps of this embodiment with a time chart, the explanation will be made on the relationship between the control (the control of the clamping force and the opening stroke) of the mold position and foaming/lamination molding and outlines of the steps (a foaming/lamination injection molding process that is of an injection press type).

(1) In the mold that is in a fully opened state (Point A), the skin material is fixed to one of the mold members. The skin material need not be fixed thereto in such a manner that the mold is in a fully opened state but may be fixed thereto at the midst of closing the mold.

(2) After the skin material is fixed thereto, the mold is closed and then held in such a state that a predetermined clamping force is applied to the mold (the same state as that held in an ordinary injection molding process) (Point B).

(3) High-speed injection is started. For conditions, the injection time is set one to three seconds.

(4) A first opening operation is performed immediately after the completion of the injection (Point C). A position at which the mold is placed at the end of the opening operation is defined as a first opening position. The opening speed is described in detail in a description of Step (d) described below.

(5) The period from Point D" to Point E" corresponds to a first cooling period. In this period, the mold is held in the first opening position for a predetermined period of time.

(6) The period from Point E" to Point F" corresponds to a second opening step. After the first cooling period, in order to form the air-containing, heat-insulating layer, the mold is slightly opened (Point F"). A position at which the mold is placed at the end of the slightly opening operation is defined as a first opening position.

(7) The period from Point F" to Point G" corresponds to a second cooling period in which the skin material is reheated. After a predetermined time is elapsed, the mold is opened (Point H").

(8) The period from Point G" to Point H" corresponds to an opening step of removing a product. The mold is fully opened and the formed article is then demolded therefrom with a formed article-removing device (an ejector).

The steps of this embodiment will now be described in detail with reference to FIG. 3.

Steps (a) to (c)

Step (a) corresponds to a step of fixing the skin material to one of a pair of the mold members while the mold is maintained opened. Step (b) corresponds to a step of clamping the mold by moving the mold to a predetermined clamping position described below.

Step (c) is described below. In this step, the molten resin containing the foaming agent is injected into the mold cavity defined by the skin material and a pair of the mold members. One of the mold members is moved to a predetermined closing point such that the cavity has a volume equal to that determined by subtracting the resin volume reduced due to cooling and solidification from the volume of the injected resin. The mold is clamped with a clamping force greater than the pressure of the injected resin in advance, whereby the mold is prevented from being opened.

The clamping position is defined as "a position for allowing the cavity to have a volume equal to that determined by subtracting the resin volume reduced due to cooling and solidification from the volume of the injected resin". A necessary amount of the molten resin containing the foaming agent is injected into the mold cavity. Therefore, the packing pressure (the peak pressure at the point of time when the injection is completed) can be achieved at the point of time when the injection is completed.

The term "the injection is completed in a preset time" means that high-speed injection is performed. The high-speed injection can be defined using the injection speed (the amount of the resin that can be injected into the mold in a unit time) when the volume of the mold cavity is constant; however, actual molds have different sizes. If the clamping force is limited within a range of 350 to 2000 tons, the injection speed ranges from 300 to 1200 g/sec. In this embodiment, the high-speed injection is defined with the time necessary to fill the mold cavity without depending on the mold size.

The reason why the high-speed injection is necessary for the foaming molding process is to prevent a foaming gas, confined in the molten resin, from being released from a flow front during the injection. According to the high-speed injection, the amount of the released foaming gas can be reduced, the temperature of the injected resin can be prevented from being decreased, and the thickness of the skin layer can therefore be reduced.

Steps (d) and (e)

Step (d) corresponds to a step of opening the mold by moving the mold to the first opening position for achieving the preset opening stroke immediately after the completion of the injection. The first opening position for achieving the preset opening stroke is defined as a position for allowing the formed article to have a final size determined depending on the foaming magnification of the formed article. The mold is continuously opened by moving the mold to the final opening position; that is, the control of the opening speed at the time of core-backing step is carried out. The opening speed is determined in view of heat-insulating properties of the skin material and the state of the skin layer as described below.

Since it takes much time to form the skin layer because of the heat insulation of the skin material, a procedure for opening the mold is as illustrated by a parabolic pattern shown in FIG. 3. The reason for employing such a procedure is to promote the formation of the skin layer by opening the mold at low speed in an initial stage of the opening operation. On the other hand, since foaming must be completed while the molten resin has a viscosity suitable to foaming, the mold must be opened at high speed at a final stage of the opening operation.

Step (e) is described below. Step (e) includes the first cooling period, in which the mold is held in the first opening position for the predetermined period. The predetermined period is described below.

In this step, as well as that described in the second embodiment, the technique disclosed in JP-A-10-156884 is employed.

After the injection of the core resin is completed, the skin material is cooled depending on progress in the solidification of the core resin. However, since a space functioning as an air-containing, heat-insulating layer is formed, the skin material is reheated due to the amount of heat in the core resin, whereby the temperature of the skin material is increased again. The following time must be investigated and confirmed by making a trial run for determining molding conditions because the heat-insulating layer is formed: the time elapsed until the temperature of the core resin reaches a predetermined value in a temperature range (melting point Tm to glass transition point Tg) in which the skin material has rubber elasticity.

After the state described above is achieved, the load applied to the skin material is reduced to zero and the space for healing is formed. Therefore, heat is prevented from being transmitted from the skin material to the mold; hence, even if a fluffy layer of the skin material is cooled to a temperature less than or equal to the glass transition point Tg, the skin material is reheated, due to the amount of heat in the core resin, to a temperature in a temperature range from the melting point Tm to the glass transition point Tg in which the skin material has rubber elasticity. Since the mold is maintained in this state for a predetermined period of time, the fluffy layer deformed by an external force applied thereto during molding is self-healed due to the elasticity inherent in resin. Therefore, the texture of the skin material is maintained after molding. In this step, the core resin is sufficiently cooled and solidified because the melting point T'm of the core resin is higher than the glass transition point Tg of the fluffy layer of the skin material.

After this predetermined time is elapsed, Step (f) of slightly opening the mold is performed. The space (air-containing, heat-insulating layer) is formed between the skin material and the cavity wall by slightly opening the mold. This space functions as the air-containing, heat-insulating layer for preventing heat from being transmitted from the core resin to the cavity wall. Therefore, the skin material is reheated, due to the latent heat of the core resin, to a temperature higher than the glass transition point of the skin material. Since the temperature of the skin material is increased by virtue of employing this step, the skin material damaged in Steps (c) to (e) is self-healed due to elasticity inherent in resin. Therefore, the resulting skin material has the same texture as that of the skin material before the shaping step.

Step (h) corresponds to a step of removing the formed article from the mold. In this step, the mold is fully opened and the formed article is demolded therefrom with the formed article-removing device (ejector).

Since Steps (i) and (ii) are common to every embodiment, detailed descriptions thereof are omitted in this embodiment.

The present invention will now be described with reference to examples according to the order of the embodiments described above. The examples are not intended to limit the scope of the present invention.

EXAMPLES

The first embodiment is further described with examples. Molding conditions common to examples and comparative examples relating to this embodiment are as described below.

(1) Molding Material (Resin Used)

A material used is as follows: a resin material containing polypropylene (MFR is equal to 40 g per ten minutes) and 3% of a foaming agent masterbatch, dry-blended therewith, containing sodium hydrogen carbonate.

(2) Injection Molding Machine

A machine used is as follows: an electric injection molding machine, Model MD350DP, manufactured by Ube Machinery Corporation, ltd., including a pneumatic needle shut-off nozzle.

(3) Mold

A mold used is as follows: a mold, having a size of 200 mm square, for a flat plate test was used. The mold has a gate structure in which a single direct gate is placed at a side of an article to be formed.

Molding Conditions of Comparative Example 1 (Test for Investigating Injection Time)

The injection speed was set to 30 mm/sec and the injection time was set to five seconds. Other conditions were the same as those described in Example 1.

Molding Conditions of Comparative Example 2 (Test for Investigating Timing of Opening Foaming Mold)

The timing of opening a foaming mold was set to a point of time when three seconds was elapsed after the completion of injection. Other conditions were the same as those described in Example 1.

Molding Conditions of Comparative Example 3 (Test for Investigating Procedure for Controlling Pressure during Period from Completion of Injection to Start of Charging)

A procedure for controlling the pressure during a period from the completion of injection to the start of charging was as follows: the pressure was reduced from 100 MPa to zero immediately after the completion of injection, charging was performed, and the pressure was then increased to 10 MPa that is a preset value of the back pressure for the charging. Other conditions were the same as those described in Example 1.

Table 1 shows test results of the examples and comparative examples relating to the first embodiment.

TABLE 1

|  | Example 1 | Example 2 | Comparative Example 1 | Comparative Example 2 | Comparative Example 3 |
|---|---|---|---|---|---|
| Foaming Magnification | 2 | 2 | 2 | 2 | 2 |
| Thickness of Skin Layer (mm) | 0.2 | 0.2 | 0.5 | 0.8 | 0.2 |
| Appearance | Good | Good | Silver Blisters | Silver Blisters | Pockmarks |
| Cell Diameter (μm) | 50 | 50 | 100 | 100 | 1 mm Or More |
| Remarks |  |  |  |  | Screw was moved backward after the completion of injection. |

Molding Conditions of Example 1
Temperature of Resin for Molding: 200° C.
Temperature of Mold: 40° C.
Injection Speed: 150 mm/sec
Injection Pressure: 100 MPa
Injection Time: One second
Timing of Opening Mold: Just after the completion of injection (The delay time is zero.)
Foaming Magnification: Two (The cavity clearance is 1.5 mm during injection, the opening stroke is 1.5 mm during foaming, and the formed article has a thickness of 3 mm.)
Procedure for Controlling Pressure During Period from Completion of Injection to Start of Charging: A pressure of 100 MPa applied to a resin at the completion of the injection was maintained before the start of charging and then reduced to 10 MPa which was a preset value of the back pressure at the start of charging.

Molding Conditions of Example 2
Procedure for Controlling Pressure during Period from Completion of Injection to Start of Charging: A pressure of 100 MPa applied to a resin at the completion of the injection was reduced to 10 MPa which was a preset value of the back pressure and this pressure was maintained before the start of charging. Other conditions were the same as those described in Example 1.

In Examples 1 and 2, the skin layers have a small thickness, the foam cells have a fine size, and the formed articles have a good surface. This means that good formed articles can be obtained, irrespective of the mode of controlling the pressure by maintaining the pressure in a resin-reserving section, located at the front end of a screw, higher than the back pressure in a charging step during a period from the completion of injection to the start of charging.

As is clear from the results of Example 1, the injection time has a large influence on the formed articles, that is, the thickness of the skin layers increases with an increase in injection time. When the foam cells have a large size, surfaces of the formed articles have silver blisters.

When the operation of opening the mold to allow the resin to foam is started three seconds later after the injection is completed, the skin layers have a larger thickness and the foam cells have a larger size as compared with those of Examples. Furthermore, the surfaces of the formed articles have silver blisters. In Comparative Example 5 which was performed to investigate the effect of controlling the pressure in the resin-reserving section and in which a pressure of 100 MPa applied to the resin-reserving section was reduced to zero immediately after the completion of the injection and charging was then started, the foamed cells have an extremely large size and the formed article has a bad surface due to such conditions.

The first embodiment of the present invention provides the molding process for manufacturing a formed article having superior surface properties by discontinuing the mold cavity from the resin-reserving section located at the front end of the screw and performing high-speed injection. The formed article includes a surface layer having no cells or a small number of cells and an inner layer having a large number of cells. Since one of the mold members moves in one direction, the molding cycle time can be reduced and efficient production can be achieved. The article formed by this process is light in weight and has superior surface properties, high rigidity, and high heat-insulating properties.

Molding conditions common to examples and comparative examples relating to the second embodiment are as described below.

(1) Molding Material (Resin Used)

A material used is as follows: a resin material containing polypropylene (MFR is equal to 40 g per ten minutes) and 3% of a foaming agent masterbatch, dry-blended therewith, containing sodium hydrogen carbonate.

(2) Skin Material

A material used is as follows: a leather skin material, including a TPO foaming layer (a foaming magnification of 20), having a thickness of 2.5 mm.

(3) Injection Molding Machine

A machine used is as follows: an electric injection molding machine, Model MD350DP, manufactured by Ube Machinery Corporation, ltd., including a pneumatic needle shut-off nozzle.

(4) Mold

A mold used is as follows: a mold, having a size of 200 mm square, for a flat plate test. The mold has a gate structure in which a single direct gate is placed at a side of a formed article.

(5) Molding Conditions

A process used in the examples and the comparative examples is as follows: a so-called foaming/lamination injection molding process in which injection is performed in such a manner that a mold is opened, that is, injection press is performed. Molding conditions of the examples and the comparative examples are as described below.

Example 3

The mold was closed by moving a mold to a position for achieving an opening stroke of 10 mm and maintained in this state, and a molten resin was injected into a cavity of the mold. After the injection was completed, the mold was clamped at a clamping speed of 50 mm/sec with a clamping force of 1000 kN.

The temperature for molding the resin was set to 200° C., the temperature of the mold was set to 40° C., the injection speed was set to 150 mm/sec, the injection time was set to one second, and the injection pressure was set to 100 MPa. The mold was opened to allow the resin to foam (core backing) one second later after the mold was closed (the shaping time was set to one second).

The foaming magnification was set to two (the cavity clearance is 1.5 mm before the mold is opened and the opening stroke is 1.5 mm when the resin is allowed to foam; hence, a formed article has a thickness of 3 mm).

The mold was opened to allow the resin to foam (core pulling was performed) in the first operation such that the opening stroke is 1.5 mm, further opened (the opening stroke was 2 mm) in the second operation five seconds later after the first operation (the first cooling period of time was five seconds), cooled to a temperature sufficient to demold the formed article from the mold, and then fully opened, whereby the formed article was demolded therefrom.

The pressure in a resin-reserving section located at the front end of a screw was controlled during the period from the completion of the injection to the start of charging in such a manner that "a pressure of 100 MPa applied to the resin-reserving section at the completion of the injection was held before the start of the charging and then reduced to 10 MPa that was a preset back pressure at the start of charging".

Example 4

The pressure in the resin-reserving section located at the front end of the screw was controlled during the period from the completion of injection to the start of charging in such a manner that "a pressure of 100 MPa applied to the resin-reserving section at the completion of the injection was reduced to 10 MPa to which the back pressure was preset and the pressure in the resin-reserving section was maintained at 10 MPa until the charging was started". Other conditions were the same as those described in Example 3.

Comparative Example 4

The mold was opened by moving the mold to a position for achieving an opening stroke of 2 mm and then held in this state, and the molten resin was injected into the mold cavity. Other conditions were the same as those described in Example 3.

Comparative Example 5

The clamping speed in the second operation (the clamping speed in a shaping operation) was set to 10 mm/sec. Other conditions were the same as those described in Example 3.

Comparative Example 6

The pressure in the resin-reserving section located at the front end of the screw was controlled during the period from the completion of the injection to the start of the charging in such a manner that "a pressure of 100 MPa applied to the resin-reserving section at the completion of the injection was reduced to zero immediately after the completion thereof, the charging was started, and the pressure in the resin-reserving section was increased to 10 MPa to which the back pressure was preset". Other conditions were the same as those described in Example 3.

Comparative Example 7

The mold was opened to allow the resin to foam (core pulling was performed) by moving the mold to a first opening position for achieving an opening stroke of 1.5 mm but was not further opened. The mold was held in the first opening position until the formed article was demolded from the mold. Other conditions were the same as those described in Example 3.

Table 2 shows test results of the examples and the comparative examples.

TABLE 2

|  | Example 3 | Example 4 | Comparative Example 4 | Comparative Example 5 | Comparative Example 6 | Comparative Example 7 |
| --- | --- | --- | --- | --- | --- | --- |
| Foaming Magnification | 2 | 2 | 2 | 2 | 2 | 2 |
| Thickness of Skin Layer (mm) | 0.2 | 0.2 | 0.5 | 0.8 | 0.2 | 0.2 |
| Appearance of Resin Surface | Good | Good | Silver Blisters | Silver Blisters | Pockmarks | Good |
| Thickness of Skin Layer (mm) | 2.2 | 2.2 | 1.5 | 2.0 | 2.2 | 1.5 |
| Situation |  |  | Foaming Layer Melted | Short Shot |  |  |
| Cell Diameter (μm) | 50 | 50 | 100 | 100 | 1000 Or More | 50 |
| Remarks |  |  |  |  | *1 |  |

*1 The screw was moved backward after the injection was completed.

In Examples 3 and 4, the skin layers had a small thickness, the foam cells were fine in size, and the formed articles had a good surface. The skin materials had a thickness of 2.2 mm and substantially the same shapes as their original shapes.

Comparative Example 4 is a test for investigating the impact of the opening stroke during the injection. In this comparative example, since the opening stroke was extremely small, the formed article had a reduced thickness due to wear occurring in the foaming layer.

Comparative Example 5 is a test for investigating the impact of the re-clamping force. In this comparative example, the cavity was not completely filled with the resin, that is, the resin was injected into the cavity in a short shot. The skin layer had a large thickness and the foam cells were coarse.

Comparative Example 6 is a test for investigating the impact of a procedure for controlling the pressure in the resin-reserving section located at the front end of the screw during the period from the completion of the injection to the start of the charging. In this comparative example, since the resin placed in the resin-reserving section was allowed to foam as described above, giant cells were formed and the formed article had a bad surface.

Comparative Example 7 is a test for investigating the impact of a damage-healing step. In this comparative example, since there was no damage-healing step, the skin material was compressed and therefore had a thickness of 1.5 mm.

According to this embodiment, a lightweight formed article having a laminated structure, high rigidity, and good appearance can be formed with high efficiency (in a short molding cycle) by the foaming molding process in which the skin material and the resin are integrated into one pieces, the mold cavity is discontinued from the resin-reserving section located at the front end of the screw, injection press molding is performed, and shaping is performed by high-speed clamping. The formed article is decorated with the skin material and includes a surface layer having no cells or a microcellular structure with a small number of cells and an inner layer having a large number of cells. In particular, when the skin material is not resistant to a thermal load and/or mechanical load due to the injected molten resin, great advantages can be obtained.

When the opening stroke for injection and the clamping force for shaping are determined as specified herein, greater advantages can be obtained.

Molding conditions common to examples and comparative examples relating to the third embodiment in which the foaming/lamination injection molding process is used are as described below.

(1) Molding Material (Resin Used)

A material used is as follows: a resin material containing polypropylene (MFR is equal to 40 g per ten minutes) and 3% of a foaming agent masterbatch, dry-blended therewith, containing sodium hydrogen carbonate.

(2) Skin Material

A material used is as follows: a fluffy skin material, including polyester fibers, having a thickness of 2 mm.

(3) Injection Molding Machine

A machine used is as follows: an electric injection molding machine, Model MD350DP, manufactured by Ube Machinery Corporation, ltd., including a pneumatic needle shut-off nozzle.

(4) Mold

A mold used is as follows: a mold, having a size of 200 mm square, for a flat plate test. The mold has a gate structure in which a single direct gate is placed at a side of an article to be formed.

(5) Molding Conditions

The following conditions are described below: molding conditions of the examples in which the foaming/lamination injection molding process according to this embodiment is used and molding conditions of the comparative examples of which some conditions do not meet those of the foaming/lamination injection molding process according to this embodiment.

Example 5

After the mold was clamped with a clamping force of 2000 kN, a molten resin containing a foaming agent was injected into a cavity of the mold. The temperature for molding the resin was set to 200° C., the temperature of the mold was set to 40° C., the injection speed was set to 150 mm/sec, the injection time was set to one second, and the injection pressure was set to 100 MPa. The mold was opened to allow the resin to foam (core pulling was performed) immediately after the injection was completed (the delay time was set to zero).

The foaming magnification was set to two (the cavity clearance is 1.5 mm before the mold is opened and the opening stroke is 1.5 mm when the resin is allowed to foam; hence, a formed article has a thickness of 3 mm).

The mold was opened to allow the resin to foam (core pulling was performed) in the first operation such that the opening stroke is 1.5 mm, further opened (the opening stroke was 2 mm) in the second operation five seconds later after the first operation (the first cooling period of time was five seconds), cooled to a temperature sufficient to demold the formed article from the mold, and then fully opened, whereby the formed article was demolded therefrom.

The pressure in a resin-reserving section located at the front end of a screw was controlled during the period from the completion of the injection to the start of charging in such a manner that "a pressure of 100 MPa applied to the resin-reserving section at the completion of the injection was held before the start of the charging and then reduced to 10 MPa that was a preset back pressure at the start of charging".

Example 6

The pressure in the resin-reserving section located at the front end of the screw was controlled during the period from the completion of the injection to the start of the charging in such a manner that "a pressure of 100 MPa applied to the resin-reserving section at the completion of the injection was reduced to 10 MPa to which the back pressure was preset and the pressure in the resin-reserving section was maintained at 10 MPa until the charging was started". Other conditions were the same as those described in Example 5.

Example 7

Conditions were the same as those described in Example 5 except that the formed article was partly covered with the skin material.

Comparative Example 8

The injection speed was set to 30 mm/sec and the injection time was set to five seconds. Other conditions were the same as those described in Example 5.

Comparative Example 9

The mold was opened to allow the resin to foam (core pulling was performed) three seconds later after the injection was completed. Other conditions were the same as those described in Example 5.

Comparative Example 10

The pressure in the resin-reserving section located at the front end of the screw was controlled during the period from the completion of the injection to the start of the charging in such a manner that "a pressure of 100 MPa applied to the resin-reserving section at the completion of the injection was reduced to zero immediately after the completion thereof, the charging was started, and the pressure in the resin-reserving section was increased to 10 MPa to which the back pressure was preset". Other conditions were the same as those described in Example 5.

Comparative Example 11

The mold was opened to allow the resin to foam (core pulling was performed) by moving the mold to a first opening position for achieving an opening stroke of 1.5 mm but was not further opened. The mold was held in the first opening position until the formed article was demolded from the mold. Other conditions were the same as those described in Example 5.

Comparative Example 12

The injection speed was set to 30 mm/sec and the injection time was set to five seconds. Other conditions were the same as those described in Comparative Example 10.

Comparative Example 13

The mold was opened to allow the resin to foam (core pulling was performed) three seconds later after the injection was completed. Other conditions were the same as those described in Comparative Example 10.

Table 3 shows test results of the examples Table 4 shows test results of the comparative examples.

TABLE 3

|  | Example 5 | Example 6 | Example 7 |
|---|---|---|---|
| Foaming Magnification (times) | 2 | 2 | 2 |
| Thickness of Skin Layer (mm) | 0.2 | 0.2 | 0.2 |
| Appearance of Resin | Good | Good | Good |
| Situation of Skin Material | Fluffy | Fluffy | Fluffy |
| Cell Diameter (μm) | 50 | 50 |  |
| Remarks | — | — | — |

TABLE 4

|  | Comparative Example 8 | Comparative Example 9 | Comparative Example 10 | Comparative Example 11 | Comparative Example 12 | Comparative Example 13 |
|---|---|---|---|---|---|---|
| Foaming Magnification | 2 | 2 | 2 | 2 | 2 | 2 |
| Thickness of Skin Layer (mm) | 0.5 | 0.8 | 0.2 | 0.2 | 0.2 | 0.8 |
| Appearance of Resin Surface | Silver Blisters | Silver Blisters | Pockmarks | Good | Silver Blisters | Good |

TABLE 4-continued

|  | Comparative Example 8 | Comparative Example 9 | Comparative Example 10 | Comparative Example 11 | Comparative Example 12 | Comparative Example 13 |
|---|---|---|---|---|---|---|
| Situation Skin Layer | Fluffy | Not Fluffy | Fluffy | Slightly Fluffy | Slightly Fluffy | Slightly Fluffy |
| Cell Diameter (μm) | 100 | 100 | 1000 Or More | 50 | 100 | 50 |
| Remarks | — | — | *2 | — | — | — |

*2 The screw was moved backward after the injection was completed.

In Examples 5 and 6, the skin layers had a small thickness, the foam cells were fine in size, and the formed articles had a good surface. The skin materials were fluffy and had substantially the same shapes as their original shapes.

In Example 7, the formed article was partly covered with the skin material. In this embodiment, a surface portion of the formed article not covered with the skin material (a portion of the surface of the formed article in which the resin is exposed) had no silver blisters. Furthermore, the skin layer had substantially the same thickness as that described in Example 1 and the foam cells had substantially the same size as that described in Example 1.

Comparative Example 8 was performed to investigate the impact of the injection speed. In this comparative example, since the injection time was set to a large value, foaming occurred at the top of the flowing molten resin and the formed article had therefore silver blisters thereon. Furthermore, the skin layer had a large thickness and the foam cells had a large diameter.

Comparative Example 9 was performed to investigate the impact of the timing of core pulling. Since the timing of core backing was delayed, the skin layer had a large thickness and the foam cells had a large diameter. Furthermore, the formed article had silver blisters thereon. The skin material became less fluffy because the latent heat for reheating seemed to be insufficient.

Comparative Example 10 was performed to investigate the impact of the procedure for controlling the pressure in the resin-reserving section located at the front end of the screw during the period from the completion of the injection and the start of the charging. In this comparative example, since foaming occurred in the resin-reserving section located at the front end of the screw, the foam cells had a huge diameter and the formed article had surface defects, as described above. Furthermore, since the pressure in the cavity was increased, the screw moved backward during depressurization.

Comparative Example 11 was performed to investigate the impact of the second opening step. In this comparative example, since the second opening step was omitted, the skin material was not healed of damage and the fluffy texture thereof was completely lost.

Comparative Example 12 was performed in such a manner that the injection speed was reduced and the second opening step was omitted. In this comparative example, as well as Comparative Example 8, the formed article had defects and the fluffy texture was deteriorated.

Comparative Example 13 was performed in such a manner that the timing of core pulling was delayed and the second opening step was omitted. In this comparative example, as well as Comparative Example 11, the fluffy texture was deteriorated.

According to this embodiment, a lightweight formed article having a laminated structure, high rigidity, and good appearance can be formed with high efficiency (in a short molding cycle) by the foaming molding process in which the skin material and the resin are integrated into one pieces, the mold cavity is discontinued from the resin-reserving section located at the front end of the screw, and high-speed injection is performed. The formed article is decorated with the skin material and includes a surface layer having no cells or a microcellular structure with a small number of cells and an inner layer having a large number of cells. In particular, when the formed article is partly covered with the skin material, surface properties are critical for a surface portion of the formed article that is not covered with the skin material; hence, great advantages can be obtained.

INDUSTRIAL APPLICABILITY

According to the present invention, a lightweight injection-foaming formed article having high rigidity and good appearance can be formed with high efficiency, that is, such an article can be formed in a short molding cycle, by an injection molding process using a molten resin containing a foaming agent. In the injection molding process, after the molten resin is injected into a cavity of a mold, the mold cavity is momentarily discontinued from a resin-reserving section located at the front end of a screw so as to prevent coarse cells from being formed in the resin placed in the resin-reserving section, and high-speed injection is performed to prevent a foaming gas from being released before the resin is allowed to foam.

The invention claimed is:

1. An injection-foaming molding process for manufacturing a formed article by injecting a molten resin containing a foaming agent into a cavity of a mold being retained in an openable state and then expanding the cavity by opening the mold to allow the resin to foam, consisting of:

i) a step of presetting a back pressure to a positive value, in a resin-reserving section of an injection device located at a front end of a screw of the injection device connected to the cavity of the mold, during a charging of the resin into the resin-reserving section, the back pressure being a minimum pressure on the resin in the resin-reserving section during the entire molding process;

ii) a step of injecting the resin into the cavity and increasing the pressure in the resin-reserving section during the injecting step;

iii) a step of discontinuing access to the cavity of the mold from the resin-reserving section immediately after a completion of injection of a molten resin containing a foaming agent into the mold cavity wherein the pressure decreases in the resin-reserving section; and iv) a step of keeping the resin-reserving section located at the front end of the screw under pressure equal to the preset back pressure for charging during a period from the completion of injection to a start of charging the molten resin containing the foaming agent for a next injection, and then starting a charging, wherein the resin-reserving section is discontinued with the mold cavity by using a shutoff nozzle or a valve gate after completion of injection of the molten resin into the mold cavity, and pressure in the resin-reserving section is kept at a same level as that of the preset back pressure, and wherein said preset back pressure for charging prevents a foaming gas from being released in the molten resin containing a foaming agent.

2. The injection-foaming molding process according to claim 1, wherein the injection of a necessary amount of a molten resin containing the foaming agent into the mold cavity is completed in three seconds.

3. The injection-foaming molding process according to claim 1, wherein after the mold is closed with a clamping force less than a maximum mold-opening force attributed to the injection pressure of the resin using a clamping device including a toggle clamping unit equipped with a crosshead, the position of the crosshead is controlled so as to keep clamping force constant, and the position of the crosshead is controlled, until a desired opening stroke is achieved, in such a manner that the mold is opened in a foaming step subsequent to the completion of the resin injection.

4. The injection-foaming molding process according to claim 3, wherein the mold-opening control device is driven by an electric servomotor.

5. The injection-foaming molding process according to claim 3, further comprising a step of injecting a necessary amount of a molten resin containing the foaming agent into the mold cavity having a volume equal to that determined by subtracting the resin volume reduced due to cooling and solidification from the volume of the injected resin and a step of, after the injection of the resin containing the foaming agent is completed, forming a skin layer by cooling and solidifying a surface portion of the molten resin in contact with the mold, and enlarging the cavity by opening the mold to allow the resin to foam.

6. The injection-foaming molding process according to claim 5, further comprising a step of, before the molten resin containing the foaming agent is injected into a cavity of a mold including a pair of mold members facing each other, providing a skin material between the mold members, closing the mold by moving one of the mold members to a predetermined position, and then momentarily holding the moved mold in that position and a step of injecting the molten resin containing the foaming agent into the cavity defined by the skin material and the mold.

7. The injection-foaming molding process according to claim 6, wherein a first closing position corresponds to a position for achieving an opening stoke of 5 to 50 mm.

8. The injection-foaming molding process according to claim 2, wherein after the mold is closed with a clamping force less than a maximum mold-opening force attributed to the injection pressure of the resin using a clamping device including a toggle clamping unit equipped with a crosshead, the position of the crosshead is controlled so as to keep clamping force constant, and the position of the crosshead is controlled, until a desired opening stoke is achieved, in such a manner that the mold is opened in a foaming step subsequent to the completion of the resin injection.

9. The injection-foaming molding process according to claim 8, wherein the mold-opening control device is driven by an electric servomotor.

10. The injection-foaming molding process according to claim 8, further comprising a step of injecting a necessary amount of a molten resin containing the foaming agent into the mold cavity having a volume equal to that determined by subtracting the resin volume reduced due to cooling and solidification from the volume of the injected resin and a step of after the injection of the resin containing the foaming agent is completed, forming a skin layer by cooling and solidifying a surface portion of the molten resin in contact with the mold, and enlarging the cavity by opening the mold to allow the resin to foam.

11. The injection-foaming molding process according to claim 10, further comprising a step of, before the molten resin containing the foaming agent is injected into a cavity of a mold including a pair of mold members facing each other, providing a skin material between the mold members, closing the mold by moving one of the mold members to a predetermined position, and then momentarily holding the moved mold in that position and a step of injecting the molten resin containing the foaming agent into the cavity defined by the skin material and the mold.

12. The injection-foaming molding process according to claim 11, wherein a first closing position corresponds to a position for achieving an opening stroke of 5 to 50 mm.

13. An injection-foaming molding process according to claim 1, wherein to maintain the pressure of the resin placed at the front end of the barrel at a value equal to or higher than the back pressure before the start of the charging in step iv, the pressure of the resin is positively increased by driving the screw of the injection device forward to apply a pressure to the resin placed between the top of the barrel and a shut-off nozzle between the resin-reserving section and the mold cavity.

* * * * *